(12) United States Patent
Tang et al.

(10) Patent No.: US 9,413,934 B2
(45) Date of Patent: Aug. 9, 2016

(54) OPTICAL IMAGING LENS AND ELECTRONIC DEVICE COMPRISING THE SAME

(71) Applicants: Tzu-Chien Tang, Taichung (TW); Chih-Yang Yeh, Taichung (TW)

(72) Inventors: Tzu-Chien Tang, Taichung (TW); Chih-Yang Yeh, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 14/506,711

(22) Filed: Oct. 6, 2014

(65) Prior Publication Data
US 2015/0260952 A1    Sep. 17, 2015

(30) Foreign Application Priority Data

Mar. 12, 2014 (TW) .............................. 103108738 A

(51) Int. Cl.

| | | |
|---|---|---|
| *G02B 3/02* | (2006.01) | |
| *G02B 13/18* | (2006.01) | |
| *H04N 5/225* | (2006.01) | |
| *G02B 13/00* | (2006.01) | |

(52) U.S. Cl.
CPC .......... *H04N 5/2253* (2013.01); *G02B 13/0045* (2013.01); *H04N 5/2252* (2013.01); *H04N 5/2254* (2013.01)

(58) Field of Classification Search
CPC ..... G02B 9/62; G02B 13/0045; G02B 15/177
USPC ................................................ 359/642–830
See application file for complete search history.

(56) References Cited

U.S. PATENT DOCUMENTS

| | | | |
|---|---|---|---|
| 7,957,074 B2 | 6/2011 | Asami | |
| 8,355,215 B2 | 1/2013 | Asami | |
| 8,432,619 B2 | 4/2013 | Huang | |
| 8,456,763 B2 | 6/2013 | Hsieh | |
| 2013/0114150 A1* | 5/2013 | Kwon | G02B 13/0045 359/713 |
| 2015/0029599 A1* | 1/2015 | Huang | G02B 3/04 359/713 |
| 2015/0062407 A1* | 3/2015 | Chen | G02B 9/62 348/335 |

FOREIGN PATENT DOCUMENTS

| | | |
|---|---|---|
| CN | 1332384 A | 1/2002 |
| JP | 200752237 A | 3/2007 |
| JP | 200858387 A | 3/2008 |
| TW | M354745 | 4/2009 |
| TW | 201038968 | 11/2010 |
| TW | 201227045 | 7/2012 |
| TW | 201239446 | 10/2012 |
| TW | 201241470 | 10/2012 |
| TW | 201300824 | 1/2013 |

\* cited by examiner

*Primary Examiner* — Mahidere Sahle
(74) *Attorney, Agent, or Firm* — Winston Hsu; Scott Margo

(57) ABSTRACT

An optical imaging lens includes: a first, second, third, fourth, fifth and sixth lens element, the first lens element has negative refractive power, the second lens element has negative refractive power, the third lens element has refractive power, the fourth lens element having an image-side surface with a convex portion in a vicinity of the optical axis, the fifth lens element having an image-side surface with a convex portion in a vicinity of the optical axis, and the sixth lens element having an image-side surface with a concave portion in a vicinity of its periphery, wherein the optical imaging lens set does not include any lens element with refractive power other than said first, second, third, fourth, fifth and sixth lens elements.

17 Claims, 31 Drawing Sheets

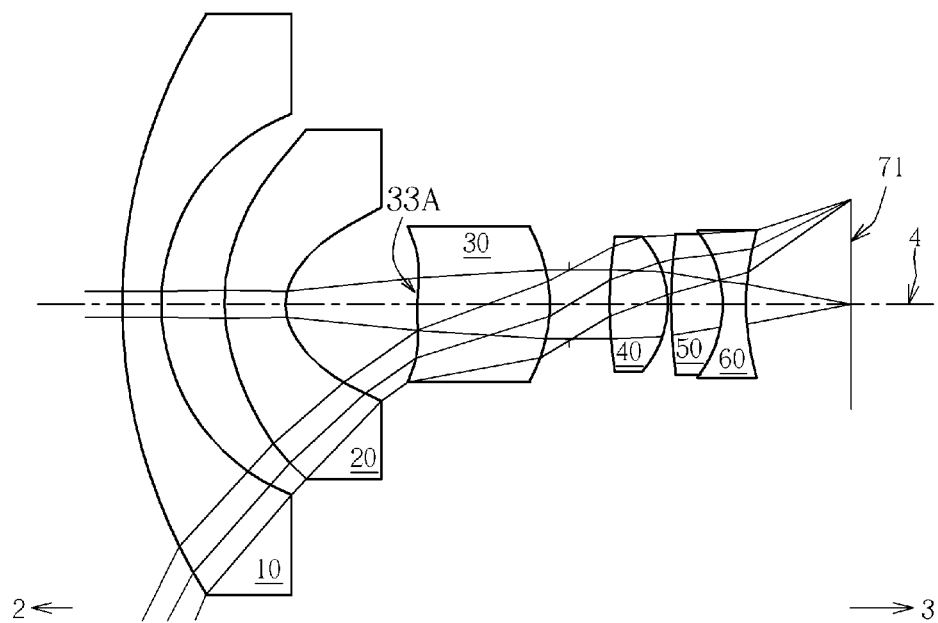
FIG. 3
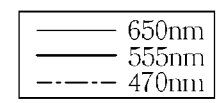
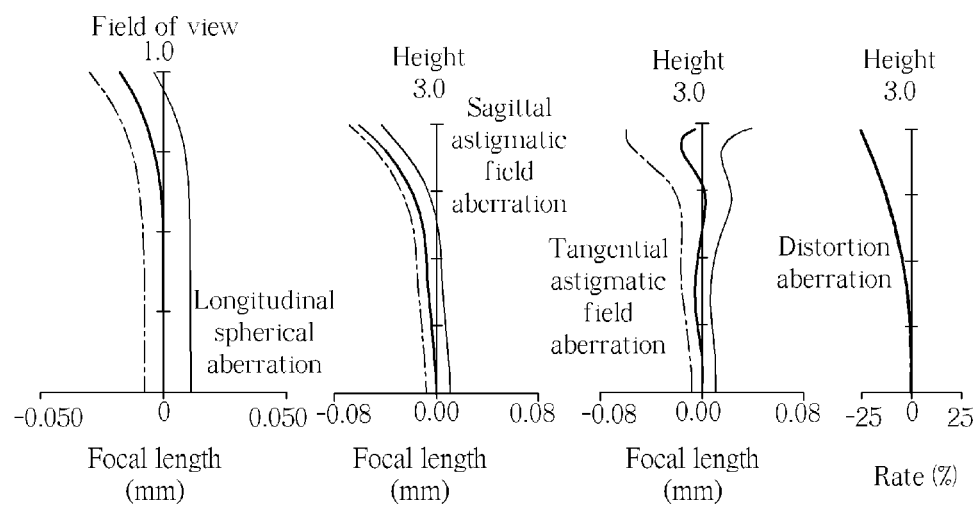
FIG. 4A    FIG. 4B    FIG. 4C    FIG. 4D

| First Example | | | | | | |
|---|---|---|---|---|---|---|
| F= 1.898 mm, HFOV(Half Field of View)= 64.534 deg., Fno= 2.6 | | | | | | |
| No. | | Curvature Radius | Ape. Stop Distance Lens Thickness Air Gap | Refractive Index | Abbe No. | Focal Length | Material |
| | Object | Infinity | | | | | |
| 11 | | 17.67249091 | 1.905027573 | 1.489 | 70.405 | -21.11758 | Glass |
| 12 | First Lens | 6.287169247 | 1.719879947 | | | | |
| 21 | Second Lens | 5.658000055 | 1.61273848 | 1.546 | 56.114 | -5.30387 | Plastic |
| 22 | | 1.72267889 | 3.611589632 | | | | |
| 31 | Third Lens | 38.59361305 | 3.528699417 | 1.546 | 56.114 | 7.81131 | Plastic |
| 32 | | -4.64001988 | 0.766278246 | | | | |
| 80 | Ape. Stop | Infinity | 0.07978992 | | | | |
| 41 | Fourth Lens | 24.60108132 | 1.068041153 | 1.546 | 56.114 | 4.22563 | Plastic |
| 42 | | -2.506929203 | 0.237780939 | | | | |
| 51 | Fifth Lens | 2507.642368 | 0.951288613 | 1.746 | 49.399 | 6.44579 | Glass |
| 52 | | -4.817014445 | 0.050308207 | | | | |
| 61 | Sixth Lens | -8.208639188 | 0.610458687 | 1.76 | 27.579 | -4.27214 | Glass |
| 62 | | 5.543929586 | 2.6 | | | | |
| | Sixth Lens -Image Plane | Infinity | 0.341893482 | | | | |
| 71 | Image Plane | Infinity | -0.005161352 | | | | |

FIG. 22

| No. | 21 | 22 | 31 | 32 | 41 | 42 |
|---|---|---|---|---|---|---|
| K | 0.00000E+00 | -8.77782E-01 | 0.00000E+00 | 0.00000E+00 | 0.00000E+00 | -3.22091E+00 |
| a4 | -5.96609E-04 | 4.62394E-03 | -9.60635E-03 | 7.68996E-03 | -2.28588E-03 | -1.35878E-02 |
| a6 | -1.92620E-05 | 2.24866E-04 | -7.58197E-04 | -2.10500E-04 | 2.90762E-03 | 3.61944E-03 |
| a8 | 0.00000E+00 | 0.00000E+00 | 1.11571E-04 | 9.02401E-04 | 0.00000E+00 | 0.00000E+00 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

FIG. 23

| Second Example ||||||||
|---|---|---|---|---|---|---|---|
| F= 1.849 mm, HFOV(Half Field of View)= 65.205 deg., Fno= 2.4 ||||||||
| No. | | Curvature Radius | Ape. Stop Distance Lens Thickness Air Gap | Refractive Index | Abbe No. | Focal Length | Material |
| | Object | Infinity | | | | | |
| 11 | | 17.03354128 | 1 | 1.489 | 70.405 | -19.95342 | Glass |
| 12 | First Lens | 6.084025353 | 1.677372461 | | | | |
| 21 | Second Lens | 5.682344964 | 1.603534309 | 1.546 | 56.114 | -5.19335 | Plastic |
| 22 | | 1.703099104 | 3.495672132 | | | | |
| 31 | Third Lens | -105.3155123 | 3.455877848 | 1.546 | 56.114 | 7.67102 | Plastic |
| 32 | | -4.074861532 | 0.4878865 | | | | |
| 80 | Ape. Stop | Infinity | 1.10083659 | | | | |
| 41 | Fourth Lens | 15.43802924 | 1.507592515 | 1.546 | 56.114 | 4.22148 | Plastic |
| 42 | | -2.61600802 | 0.1 | | | | |
| 51 | Fifth Lens | 19.05430768 | 1.350096323 | 1.775 | 49.624 | 3.96885 | Glass |
| 52 | | -3.554486759 | 0 | | | | |
| 61 | Sixth Lens | -3.554486759 | 0.6 | 1.853 | 23.825 | -2.83940 | Glass |
| 62 | | 8.192586442 | 2.6 | | | | |
| | Sixth Lens -Image Plane | Infinity | 0.156027418 | | | | |
| 71 | Image Plane | Infinity | -0.00488241 | | | | |

FIG. 24

| No. | 21 | 22 | 31 | 32 | 41 | 42 |
|---|---|---|---|---|---|---|
| K | 0.00000E+00 | -9.64252E-01 | 0.00000E+00 | 0.00000E+00 | 0.00000E+00 | -2.64879E+00 |
| a4 | -1.26279E-03 | 3.09202E-03 | -8.86966E-03 | 3.19808E-03 | -2.50813E-03 | -7.94908E-03 |
| a6 | 0.00000E+00 | 0.00000E+00 | -6.10662E-04 | 3.83182E-04 | 3.67762E-04 | 7.07363E-04 |
| a8 | 0.00000E+00 | 0.00000E+00 | 8.96966E-05 | -1.60279E-05 | 0.00000E+00 | 0.00000E+00 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

FIG. 25

| Third Example | | | | | | |
|---|---|---|---|---|---|---|
| F= 1.93 mm, HFOV(Half Field of View)= 62.182 deg., Fno= 2.6 | | | | | | |
| No. | | Curvature Radius | Ape. Stop Distance Lens Thickness Air Gap | Refractive Index | Abbe No. | Focal Length | Material |
| | Object | Infinity | | | | | |
| 11 | | 19.46030424 | 2.5 | 1.546 | 56.114 | -21.29202 | Plastic |
| 12 | First Lens | 6.947564962 | 1.768777494 | | | | |
| 21 | Second Lens | 5.92276408 | 1.655535878 | 1.546 | 56.114 | -5.20411 | Plastic |
| 22 | | 1.730659114 | 3.656846342 | | | | |
| 31 | Third Lens | 37.49055056 | 3.528699417 | 1.546 | 56.114 | 5.35778 | Plastic |
| 32 | | -3.067453676 | 0.75198573 | | | | |
| 80 | Ape. Stop | Infinity | 0.384206321 | | | | |
| 41 | Fourth Lens | -13.38906857 | 1.069849651 | 1.546 | 56.114 | 5.46600 | Plastic |
| 42 | | -2.509325771 | 0.1 | | | | |
| 51 | Fifth Lens | 87.99955203 | 1.183667836 | 1.746 | 49.399 | 4.04346 | Glass |
| 52 | | -3.105537367 | 0.0581395 | | | | |
| 61 | Sixth Lens | -3.949927827 | 0.601296095 | 1.76 | 27.579 | -3.04350 | Glass |
| 62 | | 5.948558898 | 2.6 | | | | |
| | Sixth Lens -Image Plane | Infinity | 0.099923214 | | | | |
| 71 | Image Plane | Infinity | 0.004887318 | | | | |

FIG. 26

| No. | 11 | 12 | 21 | 22 | 31 | 32 |
|---|---|---|---|---|---|---|
| K | 0.00000E+00 | 0.00000E+00 | 0.00000E+00 | -8.58849E-01 | 0.00000E+00 | 0.00000E+00 |
| a4 | 5.84448E-05 | 5.31221E-06 | -7.09510E-04 | 5.19899E-03 | -1.05418E-02 | 7.58916E-03 |
| a6 | 0.00000E+00 | 0.00000E+00 | -2.02287E-05 | 1.91997E-04 | -1.08859E-03 | 3.63172E-05 |
| a8 | 0.00000E+00 | 0.00000E+00 | 0.00000E+00 | 0.00000E+00 | 8.26205E-05 | 1.35706E-05 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| No. | 41 | 42 | | | | |
| K | 0.00000E+00 | -3.26559E+00 | | | | |
| a4 | -2.92448E-03 | -1.18289E-02 | | | | |
| a6 | 5.97709E-04 | 3.11224E-03 | | | | |
| a8 | 0.00000E+00 | 0.00000E+00 | | | | |
| a10 | 0.00000E+00 | 0.00000E+00 | | | | |
| a12 | 0.00000E+00 | 0.00000E+00 | | | | |
| a14 | 0.00000E+00 | 0.00000E+00 | | | | |
| a16 | 0.00000E+00 | 0.00000E+00 | | | | |
| a18 | 0.00000E+00 | 0.00000E+00 | | | | |

FIG. 27

| Fourth Example |||||||
|---|---|---|---|---|---|---|
| F= 2.042 mm, HFOV(Half Field of View)= 62.893 deg., Fno= 2.6 |||||||
| No. | | Curvature Radius | Ape. Stop Distance Lens Thickness Air Gap | Refractive Index | Abbe No. | Focal Length | Material |
| | Object | Infinity | | | | | |
| 11 | | 19.59077285 | 2.327042063 | 1.546 | 56.114 | -21.26699 | Plastic |
| 12 | First Lens | 6.984706399 | 1.731230235 | | | | |
| 21 | Second Lens | 6.135547152 | 1.641920224 | 1.546 | 56.114 | -5.48118 | Plastic |
| 22 | | 1.821438658 | 3.62315677 | | | | |
| 31 | Third Lens | 47.73078768 | 3.543908787 | 1.546 | 56.114 | 7.67606 | Plastic |
| 32 | | -4.474084921 | 0.788622373 | | | | |
| 80 | Ape. Stop | Infinity | 0.15220339 | | | | |
| 41 | Fourth Lens | 84.74561682 | 1.399602351 | 1.546 | 56.114 | 4.24724 | Plastic |
| 42 | | -2.370326305 | 0.34423748 | | | | |
| 51 | Fifth Lens | -10.85654716 | 1.147316165 | 1.747 | 44.85 | 5.90503 | Glass |
| 52 | | -3.278369 | 0.118420274 | | | | |
| 61 | Sixth Lens | -2.712676729 | 0.690831998 | 1.648 | 22.397 | -4.43473 | Plastic |
| 62 | | -53.25719529 | 2.6 | | | | |
| | Sixth Lens -Image Plane | Infinity | 0.412779308 | | | | |
| 71 | Image Plane | Infinity | -0.007835021 | | | | |

FIG. 28

| No. | 11 | 12 | 21 | 22 | 31 | 32 |
|---|---|---|---|---|---|---|
| K | 0.00000E+00 | 0.00000E+00 | 0.00000E+00 | -9.28652E-01 | 0.00000E+00 | 0.00000E+00 |
| a4 | 7.39013E-05 | 1.58908E-05 | -8.97666E-04 | 3.90625E-03 | -9.50880E-03 | 5.56256E-04 |
| a6 | 0.00000E+00 | 0.00000E+00 | -8.64965E-06 | 5.49633E-05 | -7.80469E-04 | 1.80799E-03 |
| a8 | 0.00000E+00 | 0.00000E+00 | 0.00000E+00 | 0.00000E+00 | 1.11271E-04 | -7.91974E-05 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| No. | 41 | 42 | 61 | 62 | | |
| K | 0.00000E+00 | -2.89162E+00 | 0.00000E+00 | 0.00000E+00 | | |
| a4 | -1.05054E-02 | -2.11952E-02 | 1.70488E-03 | -1.13257E-04 | | |
| a6 | 1.54986E-04 | 2.35460E-03 | 2.24324E-03 | 3.33622E-04 | | |
| a8 | 0.00000E+00 | 0.00000E+00 | 0.00000E+00 | 1.78676E-05 | | |
| a10 | 0.00000E+00 | 0.00000E+00 | 0.00000E+00 | 0.00000E+00 | | |
| a12 | 0.00000E+00 | 0.00000E+00 | 0.00000E+00 | 0.00000E+00 | | |
| a14 | 0.00000E+00 | 0.00000E+00 | 0.00000E+00 | 0.00000E+00 | | |
| a16 | 0.00000E+00 | 0.00000E+00 | 0.00000E+00 | 0.00000E+00 | | |
| a18 | 0.00000E+00 | 0.00000E+00 | 0.00000E+00 | 0.00000E+00 | | |

FIG. 29

| Fifth Example | | | | | | |
|---|---|---|---|---|---|---|
| F= 2.309 mm, HFOV(Half Field of View)= 60.0 deg., Fno= 2.6 | | | | | | |
| No. | | Curvature Radius | Ape. Stop Distance Lens Thickness Air Gap | Refractive Index | Abbe No. | Focal Length | Material |
| | Object | Infinity | | | | | |
| 11 | | 162.8704485 | 4 | 1.546 | 56.114 | -37.83976 | Plastic |
| 12 | First Lens | 18.1756805 | 5.965863996 | | | | |
| 21 | Second Lens | 21.98520625 | 3.933908713 | 1.546 | 56.114 | -21.35551 | Plastic |
| 22 | | 7.137696809 | 49.1250689 | | | | |
| 31 | Third Lens | Infinity | -0.305345931 | | | | |
| 32 | | 7.372626264 | 1.160909839 | 1.546 | 56.114 | 15.81579 | Plastic |
| 80 | Ape. Stop | 47.61275384 | 5.595967191 | | | | |
| 41 | Fourth Lens | 29.76228291 | 1.185669921 | 1.546 | 56.114 | 15.51109 | Plastic |
| 42 | | -11.67094459 | 0.1 | | | | |
| 51 | Fifth Lens | 10.4752607 | 2.137216399 | 1.746 | 49.399 | 4.64829 | Glass |
| 52 | | -4.731671802 | 0 | | | | |
| 61 | Sixth Lens | -4.731671802 | 0.65 | 1.76 | 27.579 | -3.75301 | Glass |
| 62 | | 7.607129047 | 2.800000002 | | | | |
| | Sixth Lens -Image Plane | Infinity | 2.448271934 | | | | |
| 71 | Image Plane | Infinity | -0.000220832 | | | | |

FIG. 30

| No. | 11 | 12 | 21 | 22 | 31 | 32 |
|---|---|---|---|---|---|---|
| K | 0.00000E+00 | 0.00000E+00 | 0.00000E+00 | -8.69448E-01 | 0.00000E+00 | 0.00000E+00 |
| a4 | 5.25533E-06 | -5.09552E-06 | -5.03803E-05 | 1.28406E-06 | -1.33643E-04 | 1.49171E-04 |
| a6 | 0.00000E+00 | 0.00000E+00 | 0.00000E+00 | 0.00000E+00 | 4.92920E-06 | 6.17519E-06 |
| a8 | 0.00000E+00 | 0.00000E+00 | 0.00000E+00 | 0.00000E+00 | -1.25995E-06 | -1.44539E-06 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

| No. | 41 | 42 | | | | |
|---|---|---|---|---|---|---|
| K | 0.00000E+00 | -3.09575E+00 | | | | |
| a4 | -2.95467E-04 | -7.90077E-05 | | | | |
| a6 | 6.90581E-06 | 5.28703E-06 | | | | |
| a8 | 0.00000E+00 | 0.00000E+00 | | | | |
| a10 | 0.00000E+00 | 0.00000E+00 | | | | |
| a12 | 0.00000E+00 | 0.00000E+00 | | | | |
| a14 | 0.00000E+00 | 0.00000E+00 | | | | |
| a16 | 0.00000E+00 | 0.00000E+00 | | | | |
| a18 | 0.00000E+00 | 0.00000E+00 | | | | |

FIG. 31

| No. | | Curvature Radius | Ape. Stop Distance Lens Thickness Air Gap | Refractive Index | Abbe No. | Focal Length | Material |
|---|---|---|---|---|---|---|---|
| | | | Sixth Example | | | | |
| | | F= 1.857 mm, HFOV(Half Field of View)= 59.169 deg., Fno= 2.4 | | | | | |
| | Object | Infinity | | | | | |
| 11 | | 9.925298768 | 1 | 1.489 | 70.405 | -28.16982 | Glass |
| 12 | First Lens | 5.577876529 | 3.255767467 | | | | |
| 21 | Second Lens | 5.905106911 | 0.988591355 | 1.546 | 56.114 | -5.04922 | Plastic |
| 22 | | 1.768313764 | 4.0700573 | | | | |
| 31 | Third Lens | 12.57599943 | 3.449552731 | 1.546 | 56.114 | 9.27134 | Plastic |
| 32 | | -7.65181139 | 0.155110634 | | | | |
| 80 | Ape. Stop | Infinity | 1.074595597 | | | | |
| 41 | Fourth Lens | 14.53458454 | 1.096043446 | 1.546 | 56.114 | 3.93771 | Plastic |
| 42 | | -2.456036241 | 0.106148559 | | | | |
| 51 | Fifth Lens | 16.75357888 | 1.011089436 | 1.775 | 49.624 | 3.15511 | Glass |
| 52 | | -2.787639645 | 0 | | | | |
| 61 | Sixth Lens | -2.787639645 | 0.3 | 1.853 | 23.825 | -2.55600 | Glass |
| 62 | | 10.50245664 | 2.8 | | | | |
| | Sixth Lens -Image Plane | Infinity | 0.502545608 | | | | |
| 71 | Image Plane | Infinity | -0.009475423 | | | | |

FIG. 32

| No. | 21 | 22 | 31 | 32 | 41 | 42 |
|---|---|---|---|---|---|---|
| K | 1.65969E-01 | -1.07422E+00 | 6.58879E-09 | -8.70605E-09 | -1.47710E-09 | -2.04342E+00 |
| a4 | -1.03899E-03 | 7.09347E-03 | -6.31721E-03 | 3.92256E-03 | -6.13654E-03 | -9.01927E-03 |
| a6 | 0.00000E+00 | 0.00000E+00 | -6.58448E-04 | -1.60821E-03 | 3.10405E-04 | 8.72405E-06 |
| a8 | 0.00000E+00 | 0.00000E+00 | 6.65356E-05 | 1.68642E-03 | 0.00000E+00 | 0.00000E+00 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

FIG. 33

| Seventh Example |||||||
|---|---|---|---|---|---|---|
| F= 2.025 mm, HFOV(Half Field of View)= 56.919 deg., Fno= 2.4 |||||||
| No. | | Curvature Radius | Ape. Stop Distance Lens Thickness Air Gap | Refractive Index | Abbe No. | Focal Length | Material |
| | Object | Infinity | | | | | |
| 11 | | 19.77893576 | 1 | 1.489 | 70.405 | -29.61963 | Glass |
| 12 | First Lens | 8.222338396 | 0.102948728 | | | | |
| 21 | Second Lens | 7.092167397 | 3.136081489 | 1.546 | 56.114 | -4.66953 | Plastic |
| 22 | | 1.582508786 | 3.067716417 | | | | |
| 31 | Third Lens | 7.485969005 | 4.044594486 | 1.546 | 56.114 | 9.24609 | Plastic |
| 32 | | -12.54540348 | 0.1 | | | | |
| 80 | Ape. Stop | Infinity | 0.869222158 | | | | |
| 41 | Fourth Lens | 20.34535079 | 1.458750007 | 1.546 | 56.114 | 4.08043 | Plastic |
| 42 | | -2.438533351 | 0.12 | | | | |
| 51 | Fifth Lens | 32.36399351 | 1.78176672 | 1.775 | 49.624 | 2.92997 | Glass |
| 52 | | -2.383369649 | 0 | | | | |
| 61 | Sixth Lens | -2.383369649 | 0.3 | 1.853 | 23.825 | -2.84187 | Glass |
| 62 | | -150 | 2.8 | | | | |
| | Sixth Lens -Image Plane | Infinity | 0.173462734 | | | | |
| 71 | Image Plane | Infinity | -0.010723439 | | | | |

FIG. 34

| No. | 21 | 22 | 31 | 32 | 41 | 42 |
|---|---|---|---|---|---|---|
| K | 4.69358E-02 | -9.98585E-01 | 1.05266E+00 | -1.54767E+01 | 2.11769E-09 | -1.84565E+00 |
| a4 | -5.28854E-04 | 4.04860E-03 | -4.54233E-03 | 6.20316E-03 | -3.69376E-03 | -8.51090E-03 |
| a6 | 0.00000E+00 | 0.00000E+00 | -5.14752E-04 | 3.65827E-04 | 7.21945E-04 | 8.14112E-05 |
| a8 | 0.00000E+00 | 0.00000E+00 | 3.71027E-05 | 8.90509E-04 | 0.00000E+00 | 0.00000E+00 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

FIG. 35

| Eighth Example ||||||||
|---|---|---|---|---|---|---|---|
| F= 1.602 mm, HFOV(Half Field of View)= 62.725 deg., Fno= 2.4 ||||||||
| No. | | Curvature Radius | Ape. Stop Distance Lens Thickness Air Gap | Refractive Index | Abbe No. | Focal Length | Material |
| | Object | Infinity | | | | | |
| 11 | | 19.47182304 | 1 | 1.489 | 70.405 | -22.36146 | Glass |
| 12 | First Lens | 6.884317804 | 1.030419434 | | | | |
| 21 | Second Lens | 6.718767613 | 0.801344969 | 1.546 | 56.114 | -5.79219 | Plastic |
| 22 | | 2.059778868 | 6.620150968 | | | | |
| 31 | Third Lens | 12.97799492 | 3.697162514 | 1.546 | 56.114 | 8.97555 | Plastic |
| 32 | | -7.081749433 | 0.1 | | | | |
| 80 | Ape. Stop | Infinity | 0.950445917 | | | | |
| 41 | Fourth Lens | 13.35422274 | 0.881008104 | 1.546 | 56.114 | 3.67391 | Plastic |
| 42 | | -2.30553765 | 0.12 | | | | |
| 51 | Fifth Lens | 28.27616856 | 1.099468095 | 1.775 | 49.624 | 2.76177 | Glass |
| 52 | | -2.276338502 | 0 | | | | |
| 61 | Sixth Lens | -2.276338502 | 0.3 | 1.853 | 23.825 | -2.03824 | Glass |
| 62 | | 7.806595304 | 2.8 | | | | |
| | Sixth Lens -Image Plane | Infinity | 0.108020612 | | | | |
| 71 | Image Plane | Infinity | -0.00799356 | | | | |

FIG. 36

| No. | 21 | 22 | 31 | 32 | 41 | 42 |
|---|---|---|---|---|---|---|
| K | -5.27879E-02 | -1.00537E+00 | 1.28491E-09 | -3.13095E+00 | -1.42361E-09 | -1.79386E+00 |
| a4 | -5.13501E-04 | 2.43769E-03 | -6.50803E-03 | 4.63571E-03 | -7.93546E-03 | -9.13774E-03 |
| a6 | 0.00000E+00 | 0.00000E+00 | -5.40258E-04 | 1.81947E-04 | 5.29588E-04 | -4.71018E-04 |
| a8 | 0.00000E+00 | 0.00000E+00 | 6.23956E-05 | 9.17318E-04 | 0.00000E+00 | 0.00000E+00 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

FIG. 37

| Ninth Example ||||||||
|---|---|---|---|---|---|---|---|
| F= 1.882 mm, HFOV(Half Field of View)= 58.823 deg., Fno= 2.4 ||||||||
| No. | | Curvature Radius | Ape. Stop Distance Lens Thickness Air Gap | Refractive Index | Abbe No. | Focal Length | Material |
| | Object | Infinity | | | | | |
| 11 | | 19.66114221 | 2.586682218 | 1.489 | 70.405 | -28.27005 | Glass |
| 12 | First Lens | 7.766217835 | 0.286801408 | | | | |
| 21 | Second Lens | 6.859016882 | 1.684367092 | 1.546 | 56.114 | -5.04543 | Plastic |
| 22 | | 1.794968703 | 4.974834341 | | | | |
| 31 | Third Lens | 12.19502733 | 3.062258982 | 1.546 | 56.114 | 9.93146 | Plastic |
| 32 | | -8.89840146 | 0.107809996 | | | | |
| 80 | Ape. Stop | Infinity | 0.295654154 | | | | |
| 41 | Fourth Lens | 16.80539283 | 2.588462955 | 1.546 | 56.114 | 4.94853 | Plastic |
| 42 | | -3.044387682 | 0.12 | | | | |
| 51 | Fifth Lens | 12.4793198 | 1.593128854 | 1.775 | 49.624 | 2.71575 | Glass |
| 52 | | -2.390570203 | 0 | | | | |
| 61 | Sixth Lens | -2.390570203 | 0.3 | 1.853 | 23.825 | -2.61553 | Glass |
| 62 | | 35.36618914 | 2.8 | | | | |
| | Sixth Lens -Image Plane | Infinity | 0.117059742 | | | | |
| 71 | Image Plane | Infinity | -0.017380622 | | | | |

FIG. 38

| No. | 21 | 22 | 31 | 32 | 41 | 42 |
|---|---|---|---|---|---|---|
| K | 3.44286E-02 | -1.03849E+00 | 3.57097E-11 | -7.36082E-10 | -1.06964E-09 | -2.27294E+00 |
| a4 | -6.05706E-04 | 5.13563E-03 | -6.73621E-03 | -4.22449E-03 | -4.65734E-03 | -4.12307E-03 |
| a6 | 0.00000E+00 | 0.00000E+00 | -9.91291E-04 | 1.42788E-03 | 2.06578E-03 | 4.17530E-04 |
| a8 | 0.00000E+00 | 0.00000E+00 | 9.77112E-05 | 2.94287E-04 | 0.00000E+00 | 0.00000E+00 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |

| | Range lower limit | Range upper limit | Example 1 | Example 2 | Example 3 | Example 4 | Example 5 | Example 6 | Example 7 | Example 8 | Example 9 |
|---|---|---|---|---|---|---|---|---|---|---|---|
| TTL | | | 19.079 | 19.131 | 19.964 | 20.513 | 78.798 | 19.801 | 18.945 | 19.501 | 20.501 |
| ALT | | | 9.676 | 9.517 | 10.539 | 10.751 | 13.068 | 7.845 | 11.721 | 7.779 | 11.815 |
| Gaa | | | 6.466 | 6.863 | 6.720 | 6.758 | 60.483 | 8.663 | 4.261 | 8.822 | 5.786 |
| BFL | | | 2.937 | 2.751 | 2.705 | 3.005 | 5.248 | 3.293 | 2.963 | 2.900 | 2.900 |
| (G23+G34)/(G45+G56) | 9.00 | 600.00 | 15.473 | 50.341 | 30.309 | 9.865 | 538.769 | 49.462 | 33.363 | 63.393 | 44.449 |
| ALT/G23 | 0.20 | 6.00 | 2.679 | 2.723 | 2.882 | 2.967 | 0.268 | 1.928 | 3.821 | 1.175 | 2.375 |
| ALT/T5 | 5.26 | 10.38 | 10.172 | 7.049 | 8.904 | 9.370 | 6.114 | 7.759 | 6.578 | 7.075 | 7.416 |
| BFL/G12 | 0.85 | 34.53 | 1.708 | 1.640 | 1.529 | 1.736 | 0.880 | 1.011 | 28.779 | 2.814 | 10.110 |
| BFL/G23 | 0.10 | 1.16 | 0.813 | 0.787 | 0.740 | 0.829 | 0.107 | 0.809 | 0.966 | 0.438 | 0.583 |
| BFL/T2 | 0.76 | 4.34 | 1.821 | 1.716 | 1.634 | 1.830 | 1.334 | 3.331 | 0.945 | 3.619 | 1.722 |
| BFL/T5 | 1.33 | 3.91 | 3.087 | 2.038 | 2.285 | 2.619 | 2.456 | 3.257 | 1.663 | 2.638 | 1.820 |
| Gaa/G12 | 2.00 | 50.00 | 3.759 | 4.091 | 3.799 | 3.904 | 10.138 | 2.661 | 41.388 | 8.562 | 20.175 |
| Gaa/G23 | 0.93 | 2.55 | 1.790 | 1.963 | 1.838 | 1.865 | 1.239 | 2.128 | 1.389 | 1.333 | 1.163 |
| Gaa/G34 | 3.50 | 17.00 | 7.642 | 4.320 | 5.914 | 7.183 | 10.808 | 7.045 | 4.396 | 8.398 | 14.341 |
| TTL/G23 | 1.40 | 10.00 | 5.283 | 5.473 | 5.459 | 5.662 | 1.614 | 4.865 | 6.176 | 2.946 | 4.121 |
| TTL/T1 | 3.47 | 23.76 | 10.015 | 19.131 | 7.986 | 8.815 | 19.700 | 19.801 | 18.945 | 19.501 | 7.925 |
| TTL/T2 | 4.00 | 26.00 | 11.830 | 11.931 | 12.059 | 12.494 | 20.031 | 20.030 | 6.041 | 24.335 | 12.171 |

OPTICAL IMAGING LENS AND ELECTRONIC DEVICE COMPRISING THE SAME

CROSS REFERENCE TO RELATED APPLICATION

This application claims priority to Taiwan Application No. 103108738, filed on Mar. 12, 2014.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of six lens elements and an electronic device which includes such optical imaging lens set of six lens elements.

2. Description of the Prior Art

In recent years, the popularity of mobile phones and digital cameras makes the sizes of various portable electronic products reduce quickly, and so does that of the photography modules. The current trend of research is to develop an optical imaging lens set of a shorter length with uncompromised good quality. The most important characters of an optical imaging lens set are image quality and size.

Therefore, how to reduce the total length of a photographic device, but still maintain good optical performance, is an important research objective.

SUMMARY OF THE INVENTION

In light of the above, the present invention proposes an optical imaging lens set that is lightweight, has a low production cost, has an enlarged half of field of view, has a high resolution and has high image quality. The optical imaging lens set of six lens elements of the present invention has a first lens element, a second lens element, a third lens element, a fourth lens element, a fifth lens element and a sixth lens element sequentially from an object side to an image side along an optical axis.

The present invention provides an optical imaging lens set, from an object side toward an image side in order along an optical axis comprising: a first lens element, a second lens element, a third lens element, a fourth lens element, a fifth lens element and a sixth lens element, the first lens element has negative refractive power, the second lens element has negative refractive power, the third lens element has refractive power, the fourth lens element has an image-side surface with a convex part in a vicinity of the optical axis, the fifth lens element has an image-side surface with a convex part in a vicinity of the optical axis, the sixth lens element has an image-side surface with a concave part in a vicinity of its periphery, wherein the optical imaging lens set does not include any lens element with refractive power other than said first, second, third, fourth, fifth and sixth lens elements.

In the optical imaging lens set of six lens elements of the present invention, an air gap G12 along the optical axis is disposed between the first lens element and the second lens element, an air gap G23 along the optical axis is disposed between the second lens element and the third lens element, an air gap G34 along the optical axis is disposed between the third lens element and the fourth lens element, an air gap G45 along the optical axis is disposed between the fourth lens element and the fifth lens element, an air gap G56 along the optical axis is disposed between the fifth lens element and the sixth lens element, and the sum of total five air gaps between adjacent lens elements from the first lens element to the sixth lens element along the optical axis is Gaa, Gaa=G12+G23+G34+G45+G56.

In the optical imaging lens set of six lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, the fifth lens element has a fifth lens element thickness T5 along the optical axis, the sixth lens element has a sixth lens element thickness T6 along the optical axis, and the total thickness of all the lens elements in the optical imaging lens set along the optical axis is ALT, ALT=T1+T2+T3+T4+T5+T6.

Besides, the total length of the optical imaging lens set is TTL, the distance between the image-side surface of the sixth lens element to an image plane along the optical axis is BFL (back focal length).

In the optical imaging lens set of six lens elements of the present invention, the relationship $(G23+G34)/(G45+G56) \geq 9.0$ is satisfied.

In the optical imaging lens set of six lens elements of the present invention, the relationship $ALT/G23 \leq 6.0$ is satisfied.

In the optical imaging lens set of six lens elements of the present invention, the relationship $5.26 \leq ALT/T5 \leq 10.38$ is satisfied.

In the optical imaging lens set of six lens elements of the present invention, the relationship $BFL/G12 \geq 0.85$ is satisfied.

In the optical imaging lens set of six lens elements of the present invention, the relationship $BFL/G23 \leq 1.16$ is satisfied.

In the optical imaging lens set of six lens elements of the present invention, the relationship $BFL/T2 \leq 4.34$ is satisfied.

In the optical imaging lens set of six lens elements of the present invention, the relationship $1.33 \leq BFL/T5 \leq 3.91$ is satisfied.

In the optical imaging lens set of six lens elements of the present invention, the relationship $Gaa/G12 \geq 2.0$ is satisfied.

In the optical imaging lens set of six lens elements of the present invention, the relationship $Gaa/G23 \leq 2.55$ is satisfied.

In the optical imaging lens set of six lens elements of the present invention, the relationship $Gaa/G34 \geq 3.50$ is satisfied.

In the optical imaging lens set of six lens elements of the present invention, the relationship $TTL/G23 \leq 10.0$ is satisfied.

In the optical imaging lens set of six lens elements of the present invention, the relationship $TTL/T1 \leq 23.76$ is satisfied.

In the optical imaging lens set of six lens elements of the present invention, the relationship $TTL/T2 \leq 26.0$ is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates a second example of the optical imaging lens set of six lens elements of the present invention.

FIG. 4A illustrates the longitudinal spherical aberration on the image plane of the second example.

FIG. 4B illustrates the astigmatic aberration on the sagittal direction of the second example.

FIG. 4C illustrates the astigmatic aberration on the tangential direction of the second example.

FIG. 4D illustrates the distortion aberration of the second example.

FIG. 22 shows the optical data of the first example of the optical imaging lens set.

FIG. 23 shows the aspheric surface data of the first example.

FIG. 24 shows the optical data of the second example of the optical imaging lens set.

FIG. 25 shows the aspheric surface data of the second example.

FIG. 26 shows the optical data of the third example of the optical imaging lens set.

FIG. 27 shows the aspheric surface data of the third example.

FIG. 28 shows the optical data of the fourth example of the optical imaging lens set.

FIG. 29 shows the aspheric surface data of the fourth example.

FIG. 30 shows the optical data of the fifth example of the optical imaging lens set.

FIG. 31 shows the aspheric surface data of the fifth example.

FIG. 32 shows the optical data of the sixth example of the optical imaging lens set.

FIG. 33 shows the aspheric surface data of the sixth example.

FIG. 34 shows the optical data of the seventh example of the optical imaging lens set.

FIG. 35 shows the aspheric surface data of the seventh example.

FIG. 36 shows the optical data of the eighth example of the optical imaging lens set.

FIG. 37 shows the aspheric surface data of the eighth example.

FIG. 38 shows the optical data of the ninth example of the optical imaging lens set.

FIG. 39 shows the aspheric surface data of the ninth example.

FIG. 40 shows some important ratios in the examples.

DETAILED DESCRIPTION

Figure 19:
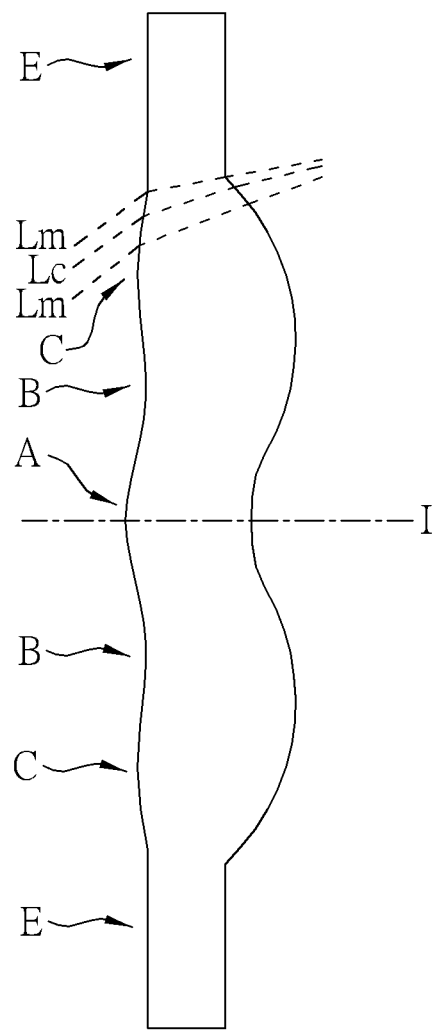
FIG. 19 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 19 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 19. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11, 13, 15 and 17.

Figure 1:
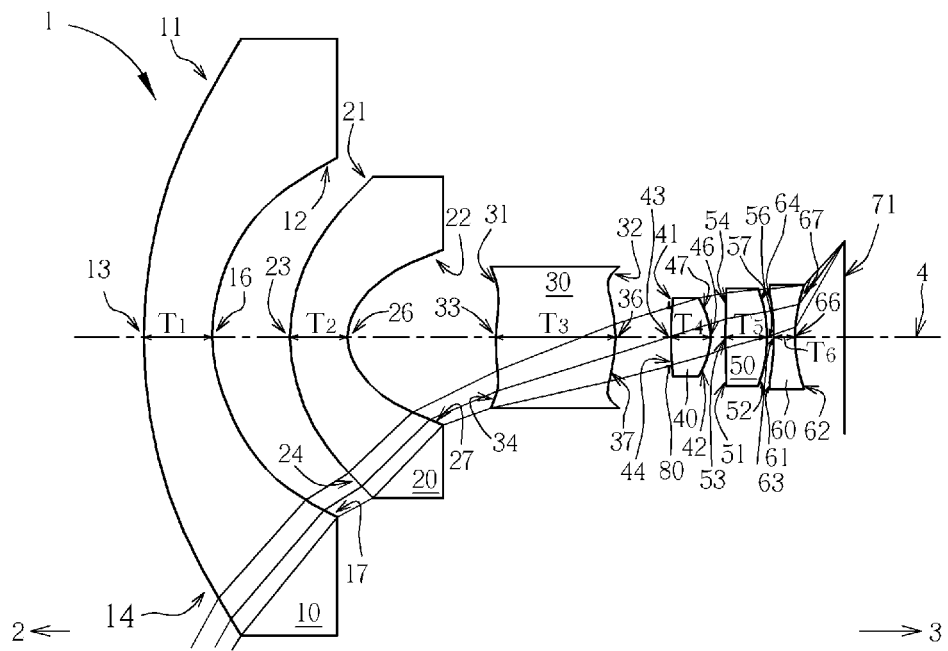
FIG. 1 illustrates a first example of the optical imaging lens set of the present invention.

As shown in FIG. 1, the optical imaging lens set 1 of six lens elements of the present invention, sequentially located from an object side 2 (where an object is located) to an image side 3 along an optical axis 4, has a first lens element 10, a second lens element 20, a third lens element 30, a fourth lens element 40, a fifth lens element 50, a sixth lens element 60 and an image plane 71. Generally speaking, the first lens element 10, the second lens element 20, the third lens element 30, the fourth lens element 40, the fifth lens element 50 and the sixth lens element 60 may be made of a transparent plastic material or glass and each has an appropriate refractive power, but the present invention is not limited to this. There are exclusively six lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the third lens element 30 and the fourth lens element 40. When light emitted or reflected by an object (not shown) which is located at the object side 2 enters the optical imaging lens set 1 of the present invention, it forms a clear and sharp image on the image plane 71 at the image side 3 after passing through the first lens element 10, the second lens element 20, the third lens element 30, the aperture stop 80, the fourth lens element 40, the fifth lens element 50 and the sixth lens element 60.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; and the sixth lens element 60 has a sixth object-side surface 61 and a sixth image-side surface 62.

Each lens element in the optical imaging lens set 1 of the present invention further has a central thickness on the optical axis 4. For example, the first lens element 10 has a first lens element thickness $T1$, the second lens element 20 has a second lens element thickness $T2$, the third lens element 30 has a third lens element thickness $T3$, the fourth lens element 40 has a fourth lens element thickness $T4$, the fifth lens element 50 has a fifth lens element thickness $T5$, and the sixth lens element 60 has a sixth lens element thickness $T6$. Therefore, the total thickness of all the lens elements in the optical imaging lens set 1 along the optical axis 4 is ALT, $ALT=T1+T2+T3+T4+T5+T6$.

In addition, between two adjacent lens elements in the optical imaging lens set 1 of the present invention there is an air gap along the optical axis 4. For example, an air gap G12 is disposed between the first lens element 10 and the second lens element 20, an air gap G23 is disposed between the second lens element 20 and the third lens element 30, an air gap G34 is disposed between the third lens element 30 and the fourth lens element 40, an air gap G45 is disposed between the fourth lens element 40 and the fifth lens element 50, and an air gap G56 is disposed between the fifth lens element 50 and the sixth lens element 60. Therefore, the sum of total five air gaps between adjacent lens elements from the first lens element 10 to the sixth lens element 60 along the optical axis 4 is Gaa, $Gaa=G12+G23+G34+G45+G56$.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the sixth image-side surface 62 of the six lens element 60 to the image plane 71 along the optical axis 4 is BFL.

FIRST EXAMPLE

Figures 2A, 2B, 2C, 2D:
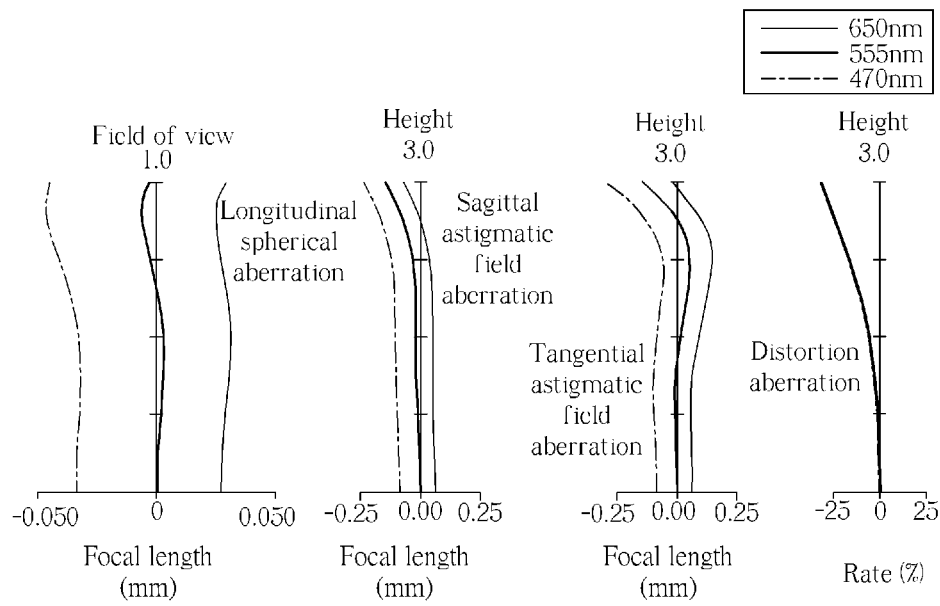
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height". The image height is 3.0 mm.

The optical imaging lens set 1 of the first example has six lens elements 10 to 60. The optical imaging lens set 1 also has an aperture stop 80 and an image plane 71. The aperture stop 80 is provided between the third lens element 30 and the fourth lens element 40.

The first lens element 10 has negative refractive power. The first object-side surface 11 facing toward the object side 2 is a convex surface, having a convex part 13 in the vicinity of the optical axis and a convex part 14 in a vicinity of its circular periphery; The first image-side surface 12 facing toward the image side 3 is a concave surface, having a concave part 16 in the vicinity of the optical axis and a concave part 17 in a vicinity of its circular periphery.

The second lens element 20 has negative refractive power. The second object-side surface 21 facing toward the object side 2 is a convex surface, having a convex part 23 in the vicinity of the optical axis and a convex part 24 in a vicinity of its circular periphery; The second image-side surface 22 facing toward the image side 3 is a concave surface, having a concave part 26 in the vicinity of the optical axis and a concave part 27 in a vicinity of its circular periphery.

The third lens element 30 has positive refractive power. The third object-side surface 31 facing toward the object side 2 has a convex part 33 in the vicinity of the optical axis and a concave part 34 in a vicinity of its circular periphery; The third image-side surface 32 facing toward the image side 3 is a convex surface, having a convex part 36 in the vicinity of the optical axis and a convex part 37 in a vicinity of its circular periphery.

The fourth lens element 40 has positive refractive power. The fourth object-side surface 41 facing toward the object side 2 is a convex surface, having a convex part 43 in the vicinity of the optical axis and a convex part 44 in a vicinity of its circular periphery; The fourth image-side surface 42 facing toward the image side 3 is a convex surface, having a convex part 46 in the vicinity of the optical axis and a convex part 47 in a vicinity of its circular periphery.

The fifth lens element 50 has positive refractive power. The fifth object-side surface 51 facing toward the object side 2 has a convex part 53 in the vicinity of the optical axis and a convex part 54 in a vicinity of its circular periphery; The fifth image-side surface 52 facing toward the image side 3 has a convex part 56 in the vicinity of the optical axis and a convex part 57 in a vicinity of its circular periphery.

The sixth lens element 60 has negative refractive power. The sixth object-side surface 61 facing toward the object side 2 has a concave part 63 in the vicinity of the optical axis and a concave part 64 in a vicinity of its circular periphery; The sixth image-side surface 62 facing toward the image side 3 has a concave part 66 in the vicinity of the optical axis and a concave part 67 in a vicinity of its circular periphery.

In the first example, the first lens element 10, the fifth lens element 50 and the sixth lens element 60 are made of glass; the second lens element 20, the third lens element 30 and the fourth lens element 40 are made of transparent plastic. The surfaces made of glass are all spherical surfaces; and the surface made of plastic, including object-side surfaces 21/31/41 and image-side surfaces 22/32/42 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant; and
$a_{2i}$ is the aspheric coefficient of the 2i order.

The optical data of the first example of the optical imaging lens set 1 are shown in FIG. 22 while the aspheric surface data are shown in FIG. 23. In the present examples of the optical imaging lens set, the f-number (Fno) of the entire optical lens element system is 2.6, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 19.08 mm. The image height is 3.0 mm, HFOV is 64.534 degrees. Some important ratios of the first example are shown in FIG. 40.

SECOND EXAMPLE

Please refer to FIG. 3 which illustrates the second example of the optical imaging lens set 1 of the present invention. It is worth noting that from the second example to the following examples, in order to simplify the figures, only the components different from what the first example has and the basic lens elements will be labeled in figures. Others components that are the same as what the first example has, such as the object-side surface, the image-side surface, the part in the vicinity of the optical axis and the part in a vicinity of its circular periphery will be omitted in the following example. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the lens material, the curvature radius, the refractive power, the lens thickness, the lens focal length, the aspheric surface or the back focal length in this example are different from the optical data in the first example, and in this example, the third object-side surface 31 of the third lens element 30 has a concave part 33A in a vicinity of the optical axis, in addition, in this example, the fifth lens element 50 and the sixth lens element 60 are cemented to each other. The optical data of the second example of the optical imaging lens set are shown in FIG. 24 while the aspheric surface data are shown in FIG. 25. The length of the optical imaging lens set is 19.13 mm. The image height is 3.0 mm, HFOV is 62.205 degrees, and Fno is 2.4. Some important ratios of the first example are shown in FIG. 40.

It is worth noting, compared with the first example, this example has some advantages such as having larger HFOV so as to increase the shooting view, having larger aperture, having better imaging quality, being easier to produce and having higher yield.

THIRD EXAMPLE

Figure 5:
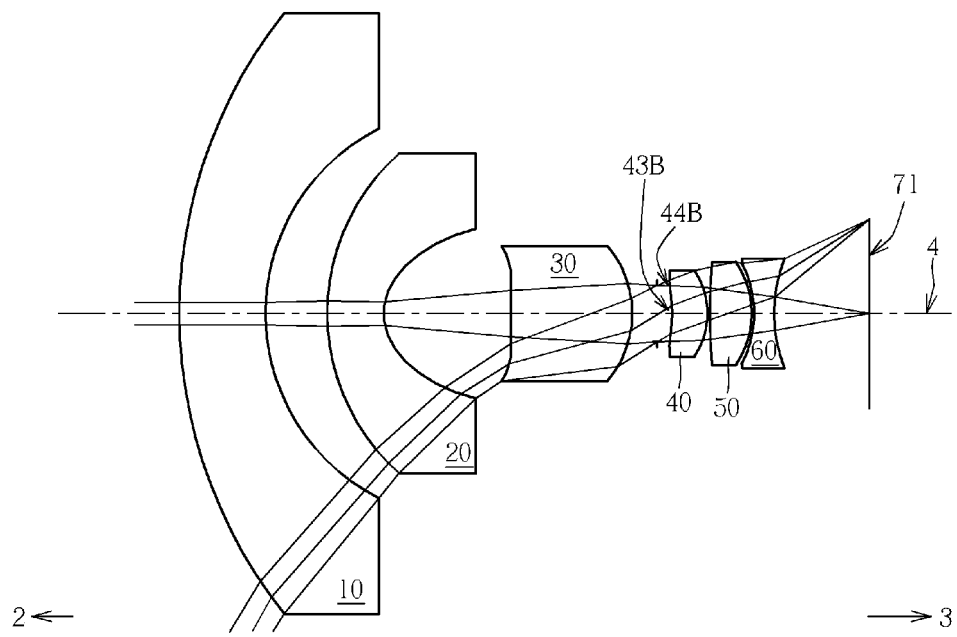
FIG. 5 illustrates a third example of the optical imaging lens set of six lens elements of the present invention.
Figures 6A, 6B, 6C, 6D:
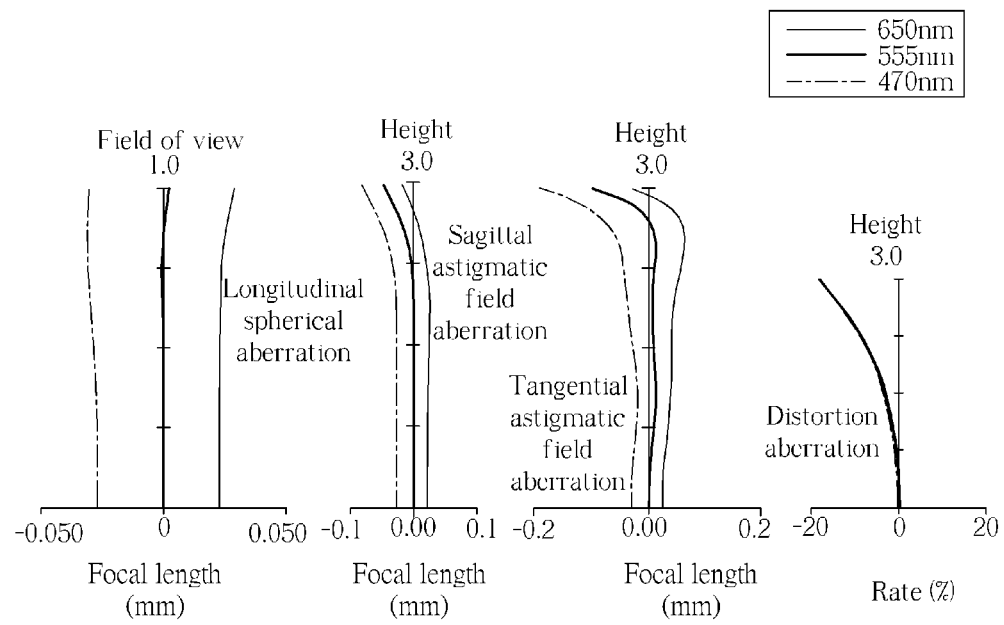
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the lens material, the curvature radius, the refractive power, the lens thickness, the lens focal length, the aspheric surface or the back focal length in this example are different from the optical data in the first example, and in this example, the fifth lens element 50 and the sixth lens element 60 are made of glass; the first lens element 10, the second lens element 20, the third lens element 30 and the fourth lens element 40 are made of transparent plastic, wherein each surface made of plastic are defined according to the formula mentioned above. In addition, in this example, the fourth object-side surface 41 of the fourth lens element 40 has a concave part 43B in the vicinity of the optical axis and a concave part 44B in a vicinity of its circular periphery. The optical data of the third example of the optical imaging lens set are shown in FIG. 26 while the aspheric surface data are shown in FIG. 27. The length of the optical imaging lens set is 19.96 mm. The image height is 3.0 mm, HFOV is 62.182 degrees, and Fno is 2.6. Some important ratios of the first example are shown in FIG. 40.

It is worth noting, compared with the first example, this example has some advantages such as being easier to produce and having higher yield.

FOURTH EXAMPLE

Figure 7:
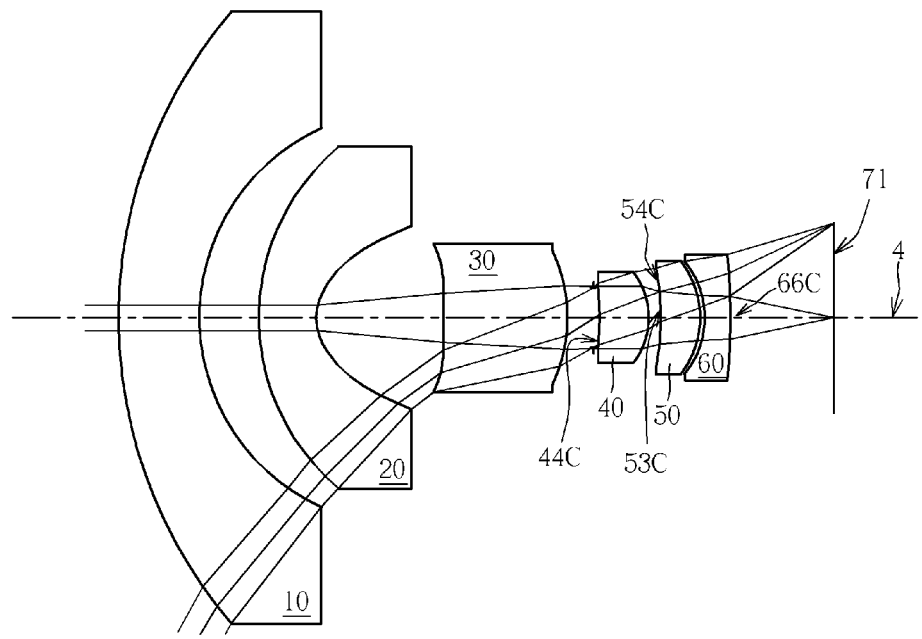
FIG. 7 illustrates a fourth example of the optical imaging lens set of six lens elements of the present invention.
Figures 8A, 8B, 8C, 8D:
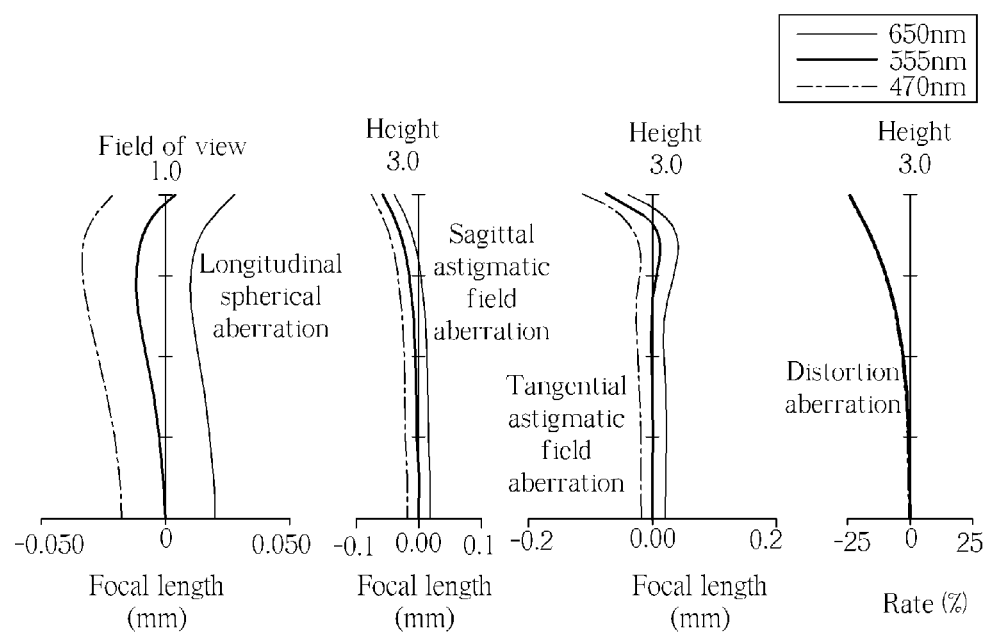
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the lens material, the curvature radius, the refractive power, the lens thickness, the lens focal length, the aspheric surface or the back focal length in this example are different from the optical data in the first example, and in this example, only the fifth lens element 50 is made of glass; the first lens element 10, the second lens element 20, the third lens element 30, the fourth lens element 40 and the sixth lens element 60 are made of transparent plastic, wherein each surface made of plastic are defined according to the formula mentioned above. In addition, in this example, the fourth object-side surface 41 of the fourth lens element 40 has a concave part 44C in a vicinity of its circular periphery; the fifth object-side surface 51 of the fifth lens element 50 has a concave part 53C in the vicinity of the optical axis and a concave part 54C in a vicinity of its circular periphery; the sixth image-side surface 62 of the sixth lens element 60 has a convex part 66C in the vicinity of the optical axis. The optical data of the fourth example of the optical imaging lens set are shown in FIG. 28 while the aspheric surface data are shown in FIG. 29. The length of the optical imaging lens set is 20.51 mm. The image height is 3.0 mm, HFOV is 62.893 degrees, and Fno is 2.6. Some important ratios of the first example are shown in FIG. 40.

It is worth noting, compared with the first example, this example has some advantages such as having better imaging quality, being easier to produce and having higher yield.

FIFTH EXAMPLE

Figure 9:
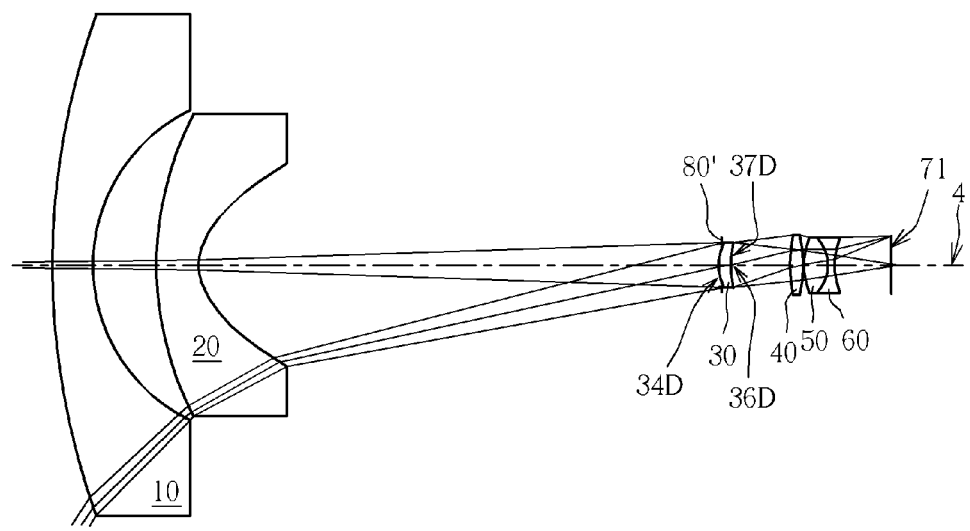
FIG. 9 illustrates a fifth example of the optical imaging lens set of six lens elements of the present invention.
Figures 10A, 10B, 10C, 10D:
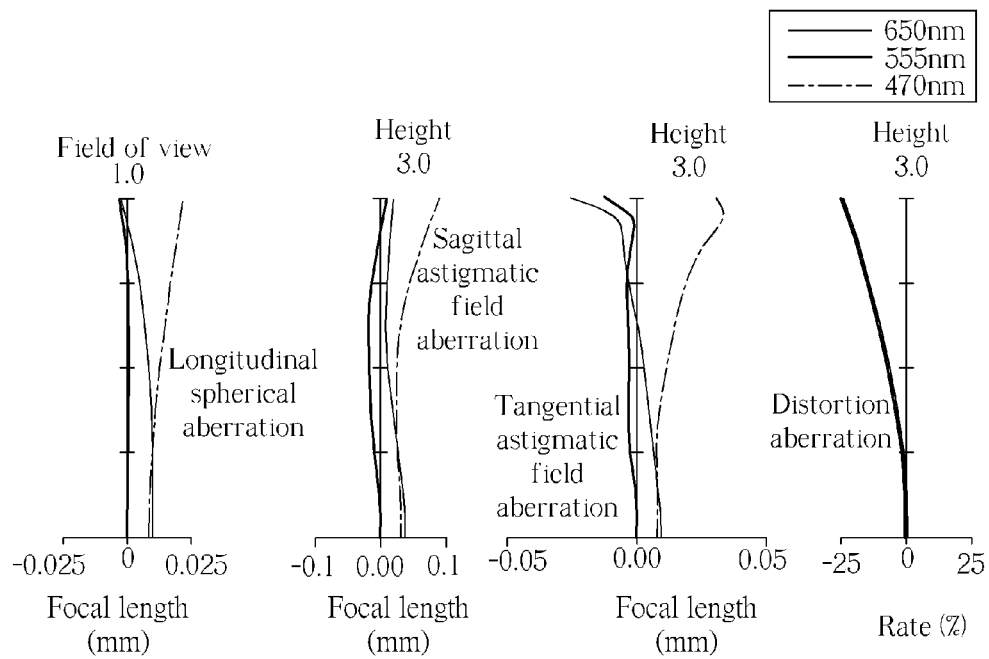
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the lens material, the curvature radius, the refractive power, the lens thickness, the lens focal length, the aspheric surface or the back focal length in this example are different from the optical data in the first example, and in this example, the fifth lens element 50 and the sixth lens element 60 are made of glass; the first lens element 10, the second lens element 20, the third lens element 30 and the fourth lens element 40 are made of transparent plastic, wherein each surface made of plastic are defined according to the formula mentioned above. In addition, in this example, the third object-side surface 31 of the third lens element 30 has a convex part 34D in a vicinity of its circular periphery, the third image-side surface 32 of the third lens element 30 has a concave part 36D in the vicinity of the optical axis and a concave part 37D in a vicinity of its circular periphery. Besides, it is worth noting, in this example, the aperture stop is disposed in a different position, more precisely, in this example, an aperture stop 80' is disposed between the second lens element 20 and the third lens element 30. Furthermore, the fifth lens element 50 and the sixth lens element 60 are cemented to each other. The optical data of the fifth example of the optical imaging lens set are shown in FIG. 30 while the aspheric surface data are shown in FIG. 31. The length of the optical imaging lens set is 78.80 mm. The image height is 3.0 mm, HFOV is 60.0 degrees, and Fno is 2.6. Some important ratios of the first example are shown in FIG. 40.

It is worth noting, compared with the first example, this example has some advantages such as having better imaging quality, being easier to produce and having higher yield.

SIXTH EXAMPLE

Figure 11:
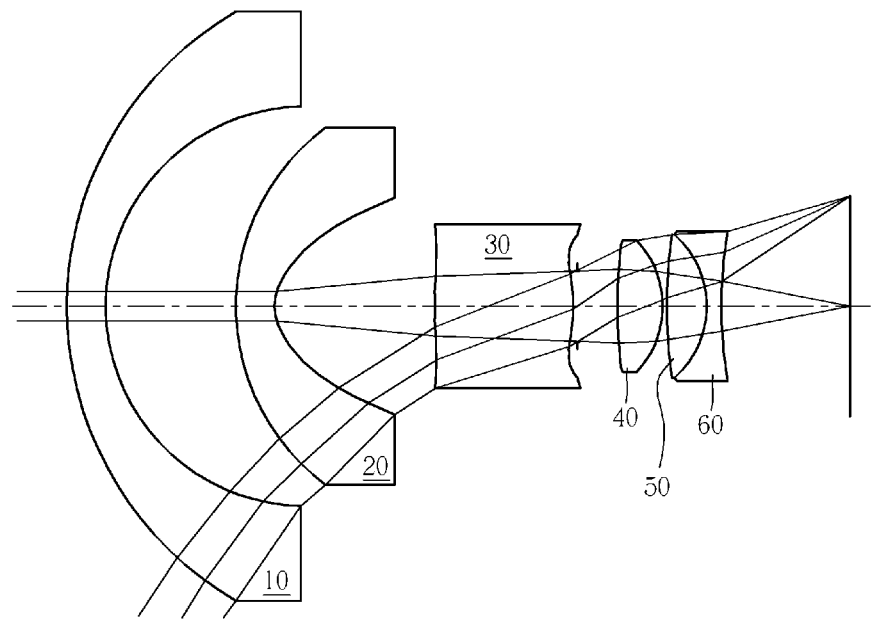
FIG. 11 illustrates a sixth example of the optical imaging lens set of six lens elements of the present invention.
Figures 12A, 12B, 12C, 12D:
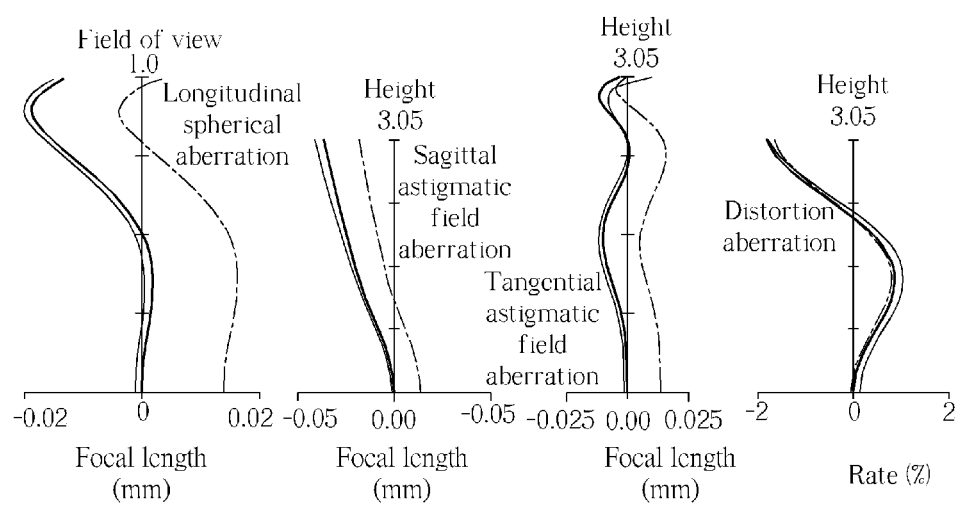
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the fifth lens element 50 and the sixth lens element 60 are cemented to each other. The optical data of the sixth example of the optical imaging lens set are shown in FIG. 32 while the aspheric surface data are shown in FIG. 33. The length of the optical imaging lens set is 19.80 mm. The image height is 3.05 mm, HFOV is 59.169 degrees, and Fno is 2.4. Some important ratios of the first example are shown in FIG. 40.

It is worth noting, compared with the first example, this example has some advantages such as having larger aperture, having better imaging quality, being easier to produce and having higher yield.

SEVENTH EXAMPLE

Figure 13:
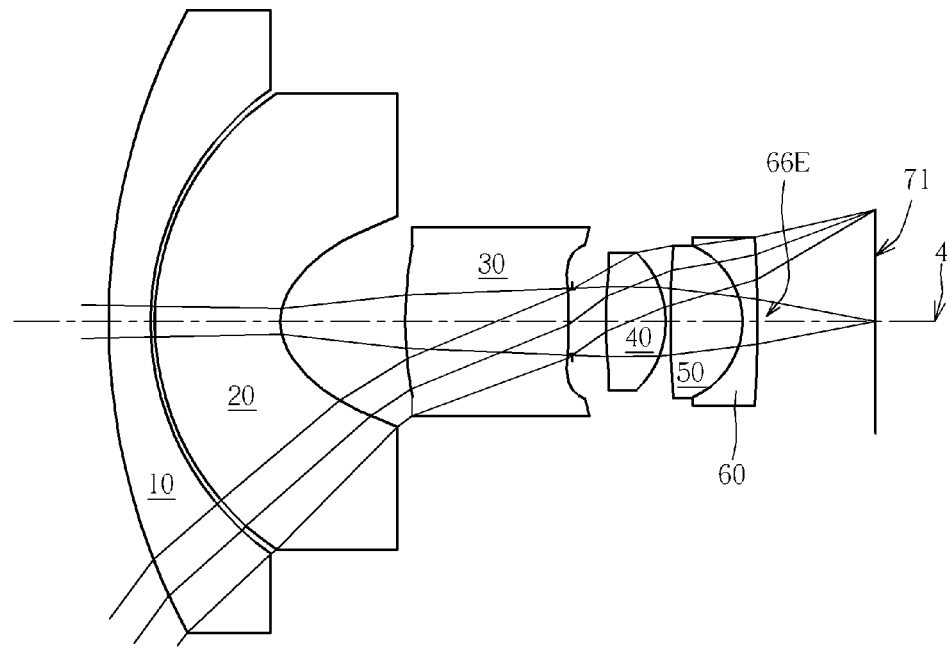
FIG. 13 illustrates a seventh example of the optical imaging lens set of six lens elements of the present invention.
Figures 14A, 14B, 14C, 14D:
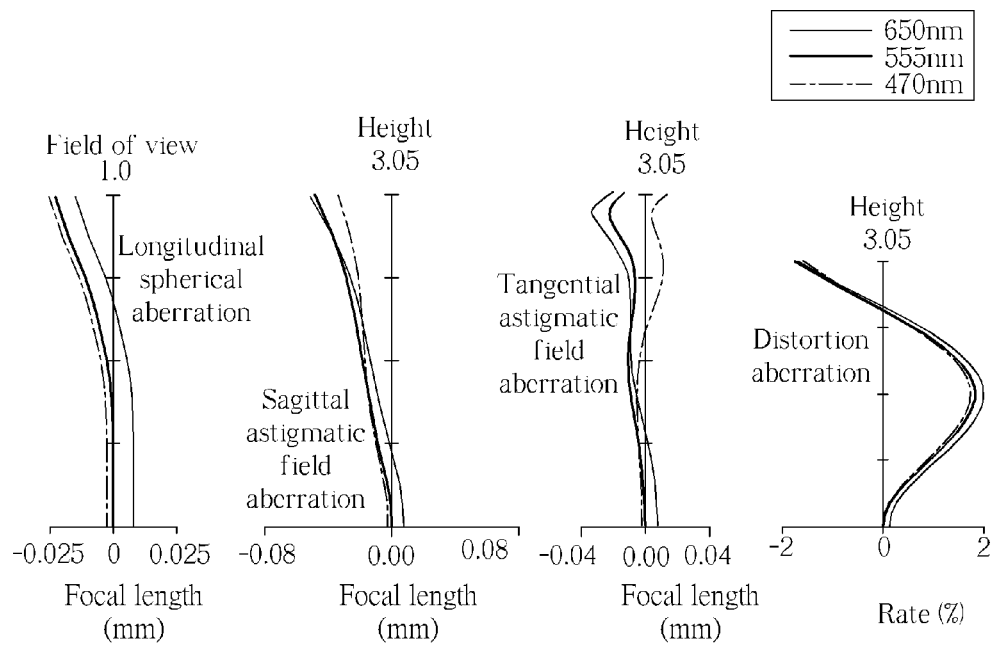
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the sixth image-side surface 62 of the sixth lens element 60 has a convex part 66E in the vicinity of the optical axis. Besides, the fifth lens element 50 and the sixth lens element 60 are cemented to each other. The optical data of the seventh example of the optical imaging lens set are shown in FIG. 34 while the aspheric surface data are shown in FIG. 35. The length of the optical imaging lens set is 18.94 mm. The image height is 3.05 mm, HFOV is 56.919 degrees, and Fno is 2.4. Some important ratios of the first example are shown in FIG. 40.

It is worth noting, compared with the first example, this example has some advantages such as having shorter total length, having larger aperture, having better imaging quality, being easier to produce and having higher yield.

EIGHTH EXAMPLE

Figure 15:
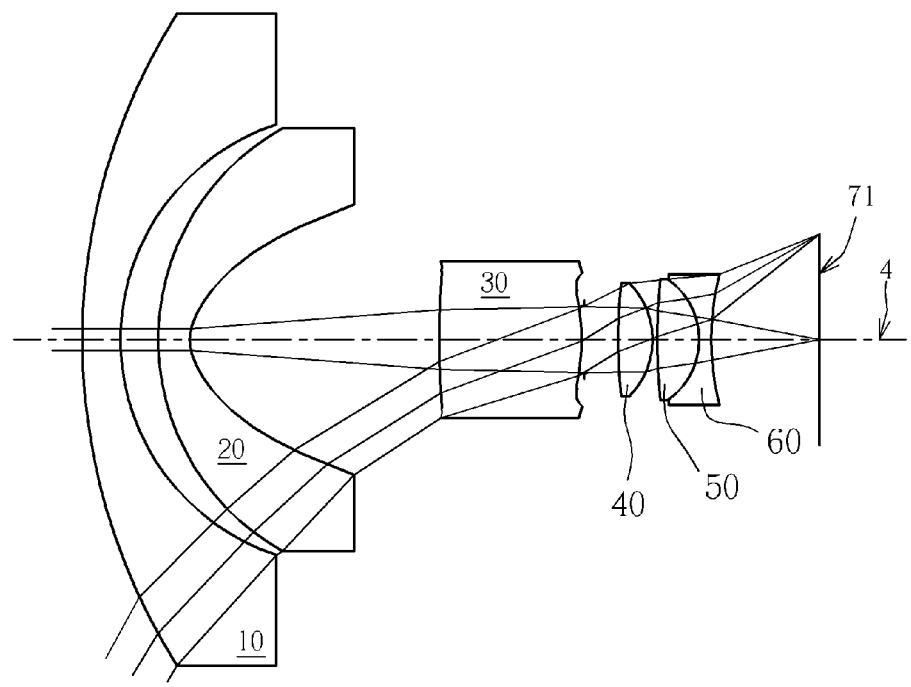
FIG. 15 illustrates an eighth example of the optical imaging lens set of six lens elements of the present invention.
Figures 16A, 16B, 16C, 16D:
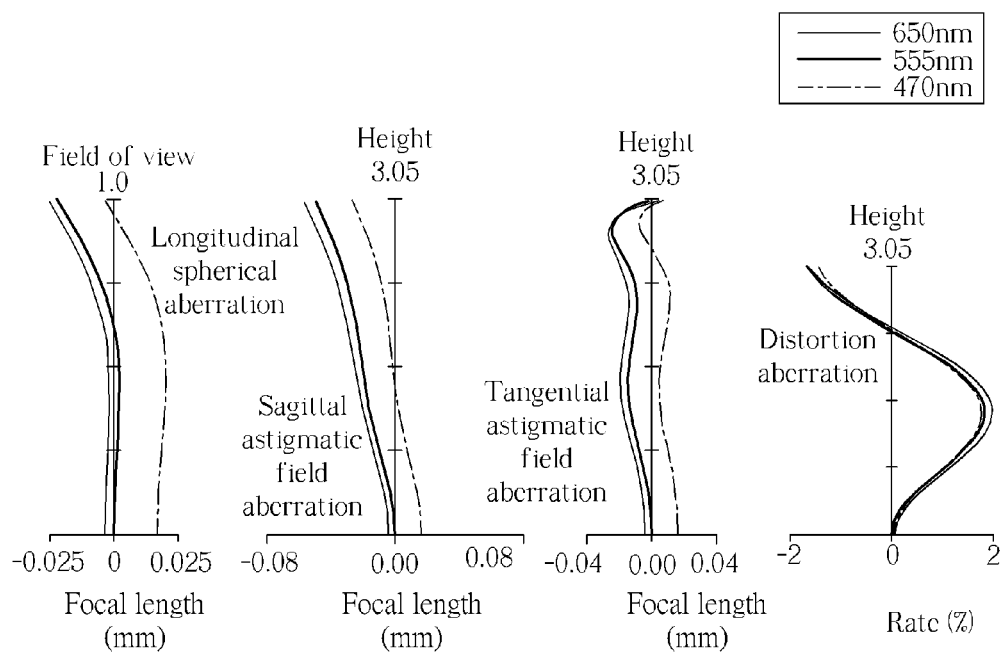
FIG. 16A illustrates the longitudinal spherical aberration on the image plane of the eighth example.
FIG. 16B illustrates the astigmatic aberration on the sagittal direction of the eighth example.
FIG. 16C illustrates the astigmatic aberration on the tangential direction of the eighth example.
FIG. 16D illustrates the distortion aberration of the eighth example.

Please refer to FIG. 15 which illustrates the eighth example of the optical imaging lens set 1 of the present invention. Please refer to FIG. 16A for the longitudinal spherical aberration on the image plane 71 of the eighth example; please refer to FIG. 16B for the astigmatic aberration on the sagittal direction; please refer to FIG. 16C for the astigmatic aberration on the tangential direction, and please refer to FIG. 16D for the distortion aberration. The components in the eighth example are similar with those in the first example, but the optical data such as the curvature radius, the refractive power, the lens thickness, the lens focal length, the aspheric surface or the back focal length in this example are different from the optical data in the first example, and in this example, the fifth lens element 50 and the sixth lens element 60 are cemented to each other. The optical data of the eighth example of the optical imaging lens set are shown in FIG. 36 while the aspheric surface data are shown in FIG. 37. The length of the optical imaging lens set is 19.50 mm. The image height is 3.05 mm, HFOV is 62.725 degrees, and Fno is 2.4. Some important ratios of the first example are shown in FIG. 40.

It is worth noting, compared with the first example, this example has some advantages such as having larger aperture, having better imaging quality, being easier to produce and having higher yield.

NINTH EXAMPLE

Figure 17:
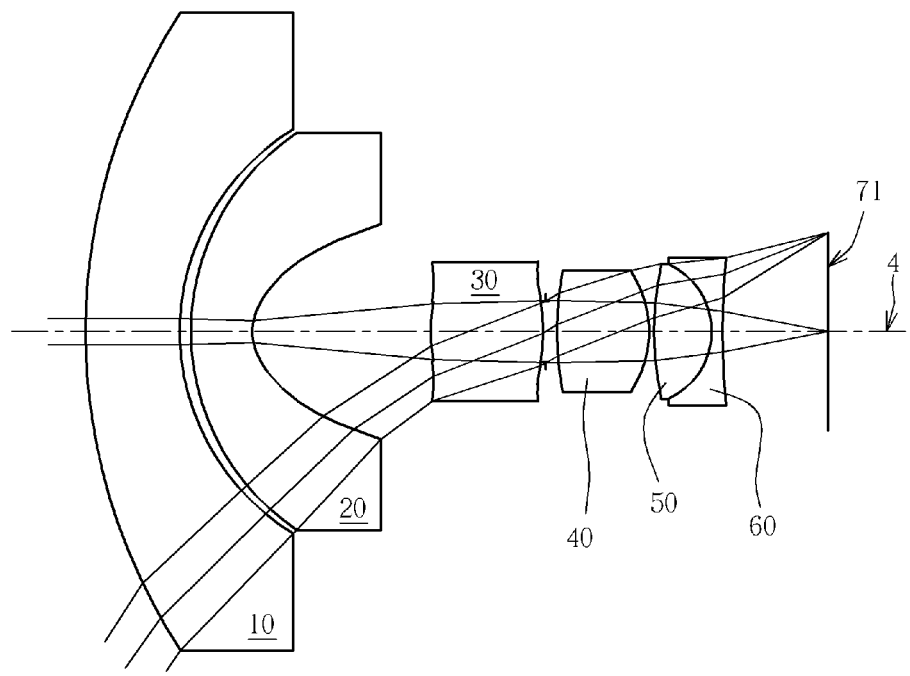
FIG. 17 illustrates a ninth example of the optical imaging lens set of six lens elements of the present invention.
Figures 18A, 18B, 18C, 18D:
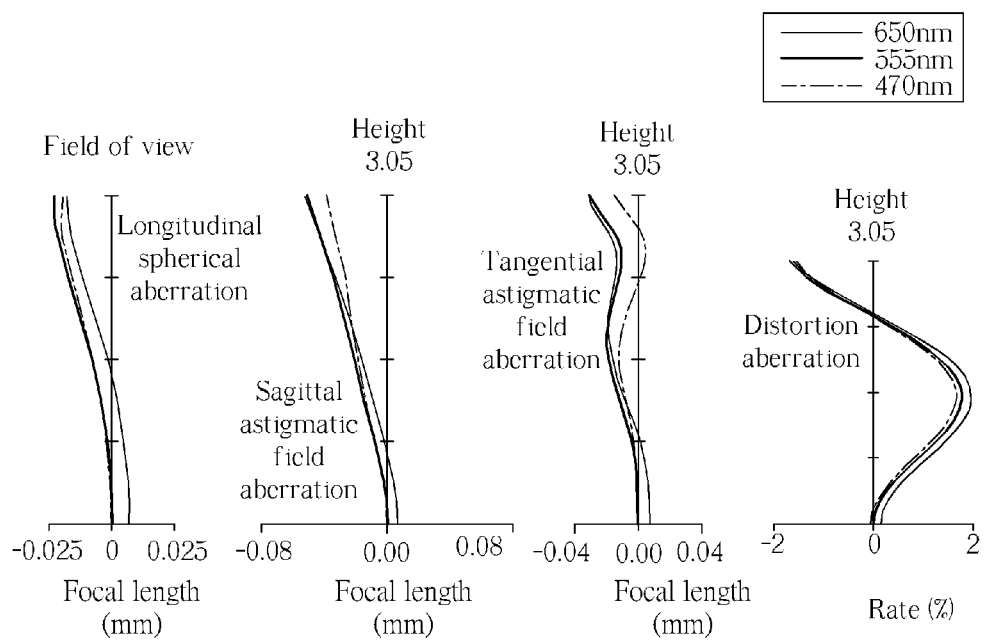
FIG. 18A illustrates the longitudinal spherical aberration on the image plane of the ninth example.
FIG. 18B illustrates the astigmatic aberration on the sagittal direction of the ninth example.
FIG. 18C illustrates the astigmatic aberration on the tangential direction of the ninth example.
FIG. 18D illustrates the distortion aberration of the ninth example.

Please refer to FIG. 17 which illustrates the ninth example of the optical imaging lens set 1 of the present invention. Please refer to FIG. 18A for the longitudinal spherical aberration on the image plane 71 of the ninth example; please refer to FIG. 18B for the astigmatic aberration on the sagittal direction; please refer to FIG. 18C for the astigmatic aberration on the tangential direction, and please refer to FIG. 18D for the distortion aberration. The components in the ninth example are similar with those in the first example, but the optical data such as the curvature radius, the refractive power, the lens thickness, the lens focal length, the aspheric surface or the back focal length in this example are different from the optical data in the first example, and in this example, the fifth lens element 50 and the sixth lens element 60 are cemented to each other. The optical data of the ninth example of the optical imaging lens set are shown in FIG. 38 while the aspheric surface data are shown in FIG. 39. The length of the optical imaging lens set is 20.50 mm. The image height is 3.05 mm, HFOV is 58.823 degrees, and Fno is 2.4. Some important ratios of the first example are shown in FIG. 40.

It is worth noting, compared with the first example, this example has some advantages such as having larger aperture, having better imaging quality, being easier to produce and having higher yield.

Following is the definitions of each parameter mentioned above and some other parameters which are not disclosed in the examples of the present invention, shown as TABLE 1:

TABLE 1

| Parameter | Definition |
|---|---|
| T1 | The thickness of the first lens element along the optical axis |
| G12 | The distance between the first lens element and the second lens element along the optical axis |
| T2 | The thickness of the second lens element along the optical axis |
| G23 | The distance between the second lens element and the third lens element along the optical axis |
| T3 | The thickness of the third lens element along the optical axis |
| G34 | The distance between the third lens element and the fourth lens element along the optical axis |
| T4 | The thickness of the fourth lens element along the optical axis |
| G45 | The distance between the fourth lens element and the fifth lens element along the optical axis |
| T5 | The thickness of the fifth lens element along the optical axis |
| G56 | The distance between the fifth lens element and the sixth lens element along the optical axis |
| T6 | The thickness of the sixth lens element along the optical axis |
| G6F | The distance between the sixth image-side surface of the sixth lens element to the filter along the optical axis |
| TF | The thickness of the filter along the optical axis |
| GFP | The distance between the filter to the image plane along the optical axis |
| f1 | The focal length of the first lens element |
| f2 | The focal length of the second lens element |
| f3 | The focal length of the third lens element |
| f4 | The focal length of the fourth lens element |
| f5 | The focal length of the fifth lens element |
| f6 | The focal length of the sixth lens element |
| n1 | The refractive index of the first lens element |
| n2 | The refractive index of the second lens element |
| n3 | The refractive index of the third lens element |
| n4 | The refractive index of the fourth lens element |
| n5 | The refractive index of the fifth lens element |
| n6 | The refractive index of the sixth lens element |
| v1 | The Abbe number of the first lens element |
| v2 | The Abbe number of the second lens element |
| v3 | The Abbe number of the third lens element |
| v4 | The Abbe number of the fourth lens element |
| v5 | The Abbe number of the fifth lens element |
| v6 | The Abbe number of the sixth lens element |

TABLE 1-continued

| Parameter | Definition |
|---|---|
| EFL | The effective focal length of the optical imaging lens set |
| TTL | The distance between the first object-side surface of the first lens element to the image plane |
| ALT | The total thickness of all the lens elements in the optical imaging lens set along the optical axis |
| Gaa | The sum of total five air gaps between adjacent lens elements from the first lens element to the sixth lens element along the optical axis |
| BFL | The distance between the image-side surface of the sixth lens element to the image plane along the optical axis |

The applicant summarized the efficacy of each embodiment mentioned above as follows:

In the present invention, all of the longitudinal spherical aberration, the astigmatism aberration and the distortion are in compliance with the using standard. In addition, the off-axis light of red, blue and green wavelengths are focused on the vicinity of the imaging point in different heights, therefore the deviation between each off-axis light and the imaging point is well controlled, so as to have good suppression for spherical aberration, aberration and distortion. Furthermore, the curves of red, blue and green wavelengths are very close to each other, meaning that the dispersion on the axis has greatly improved too. In summary, the different lens elements of the present invention are matched to each other, to achieve good image quality.

In addition, the inventors discover that there are some better ratio ranges for different data according to the above various important ratios are shown as below in TABLE 2. Better ratio ranges help the designers to design the better optical performance and an effectively reduced length of a practically possible optical imaging lens set.

TABLE 2

| Relationship | Lower limit | Upper limit |
|---|---|---|
| (G23 + G34)/(G45 + G56) | 9.00 | 600.00 |
| ALT/G23 | 0.20 | 6.00 |
| ALT/T5 | 5.26 | 10.38 |
| BFL/G12 | 0.85 | 34.53 |
| BFL/G23 | 0.10 | 1.16 |
| BFL/T2 | 0.76 | 4.34 |
| BFL/T5 | 1.33 | 3.91 |
| Gaa/G12 | 2.00 | 50.00 |
| Gaa/G23 | 0.93 | 2.55 |
| Gaa/G34 | 3.50 | 17.00 |
| TTL/G23 | 1.40 | 10.00 |
| TTL/T1 | 3.47 | 23.76 |
| TTL/T2 | 4.00 | 26.00 |

It is worth noting that, in view of the unpredictability of the optical system design, under the structure of the invention, by controlling the parameters, can help the designer to design the optical imaging lens set with good optical performance, having shorter total length, and being feasible in manufacturing process. Each parameter has its preferred range. TABLE 2 shows the preferred range lower limit and range upper limit of each relationship mentioned in the present invention.

Figure 20:
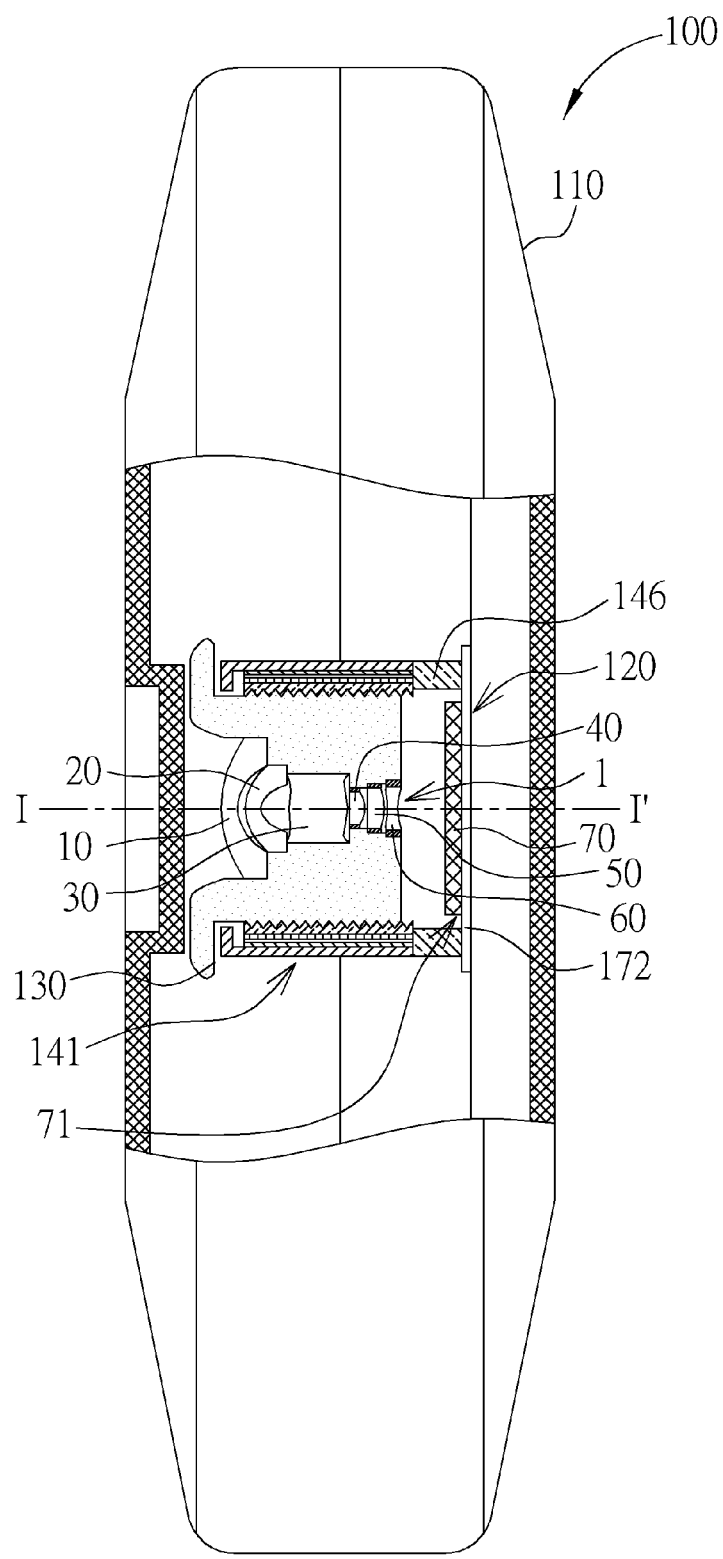
FIG. 20 illustrates a first preferred example of the portable electronic device with an optical imaging lens set of the present invention.

The optical imaging lens set 1 of the present invention may be applied to an electronic device, such as game consoles or driving recorders. Please refer to FIG. 20. FIG. 20 illustrates a first preferred example of the optical imaging lens set 1 of the present invention for use in a portable electronic device 100. The electronic device 100 includes a case 110, and an image module 120 mounted in the case 110. A driving recorder is illustrated in FIG. 16 as an example, but the electronic device 100 is not limited to a driving recorder.

As shown in FIG. 20, the image module 120 includes the optical imaging lens set 1 as described above. FIG. 20 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 21:
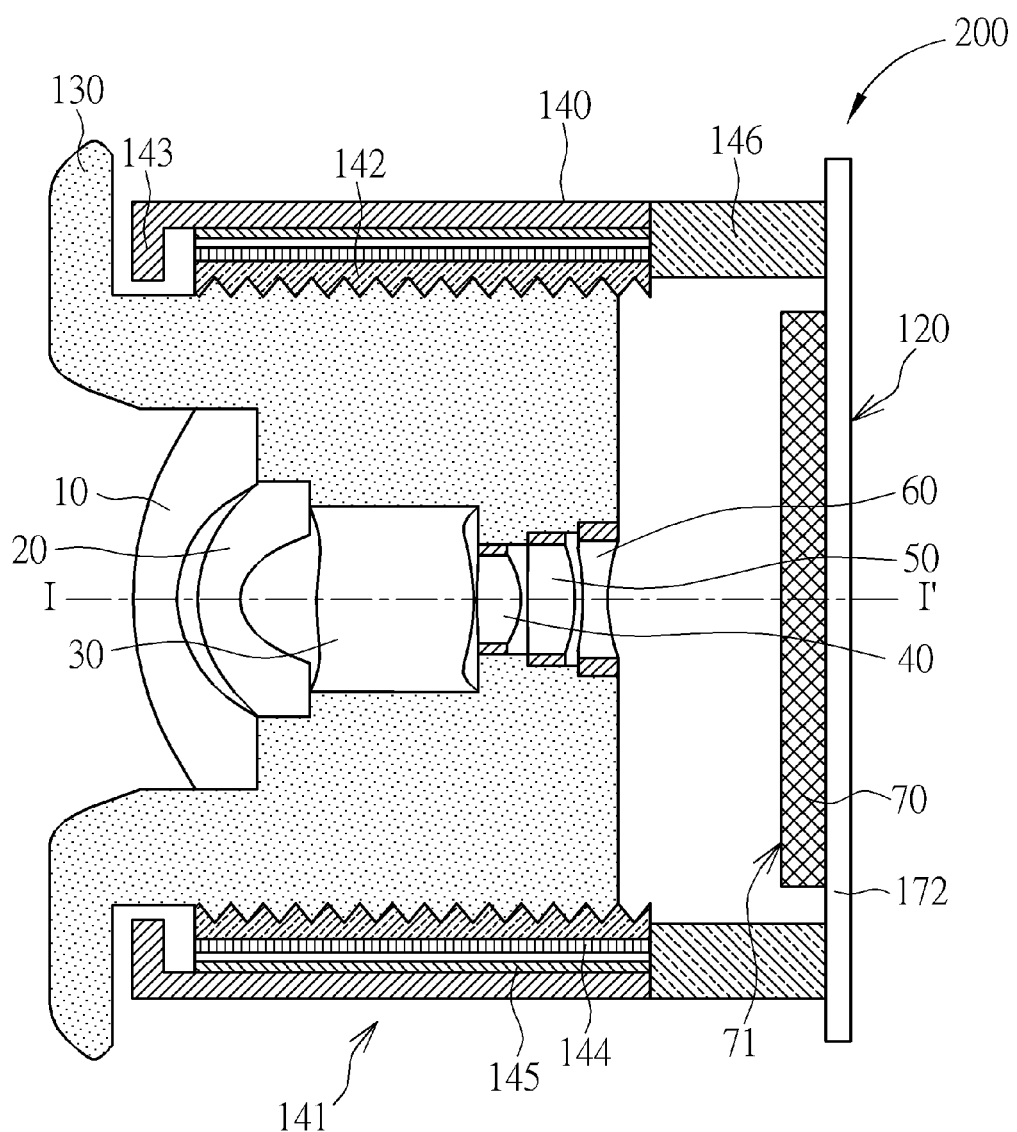
FIG. 21 illustrates a second preferred example of the portable electronic device with an optical imaging lens set of the present invention.

Please also refer to FIG. 21 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element, a fourth lens element, a fifth lens element and a sixth lens element, said first to sixth lens elements having an object-side surface facing toward the object side as well as an image-side surface facing toward the image side, wherein:
   the first lens element has negative refractive power;
   the second lens element has negative refractive power;
   the third lens element has refractive power;
   the fourth lens element has an image-side surface with a convex part in a vicinity of the optical axis;
   the fifth lens element has an image-side surface with a convex part in a vicinity of the optical axis;
   the sixth lens element has an image-side surface with a concave part in a vicinity of its periphery;
   the optical imaging lens set does not include any lens element with refractive power other than said first lens element, second lens element, in addition, a distance TTL between the object surface of the first lens element to an image plane, and a distance G23 between the second lens element and the third lens element along the optical axis satisfy a relationship TTL/G23≤10.0.

2. The optical imaging lens set of claim 1, wherein the second lens element has an object-side surface with a convex part in a vicinity of the optical axis, and the sixth lens element has an object-side surface with a concave part in a vicinity of its periphery, the sum of all five air gaps Gaa between each lens element from said first lens element to said sixth lens element along the optical axis, and a distance G12 between the first lens element and the second lens element along the optical axis satisfy a relationship Gaa/G12≥2.0.

3. The optical imaging lens set of claim 2, wherein a thickness T1 of said first lens element along said optical axis satisfies a relationship TTL/T1≤23.76.

4. The optical imaging lens set of claim 1, wherein the second lens element has an object-side surface with a convex part in a vicinity of the optical axis, and the sixth lens element has an object-side surface with a concave part in a vicinity of its periphery, a total thickness ALT of said first lens element, said second lens element, said third lens element, said fourth lens element and, fifth lens element and said sixth lens element along said optical axis satisfy a relationship ALT/G23≤6.0.

5. The optical imaging lens set of claim 4, wherein a thickness T2 of said second lens element along said optical axis satisfies a relationship TTL/T2≤26.0.

6. The optical imaging lens set of claim 1, wherein the second lens element has an object-side surface with a convex part in a vicinity of the optical axis, and the sixth lens element has an object-side surface with a concave part in a vicinity of its periphery, the sum of all five air gaps Gaa between each lens element from said first lens element to said sixth lens element along the optical axis, and a distance G34 between the third lens element and the fourth lens element along the optical axis satisfy a relationship Gaa/G34≥3.50.

7. The optical imaging lens set of claim 1, wherein the second lens element has an object-side surface with a convex part in a vicinity of the optical axis, and the sixth lens element has an object-side surface with a concave part in a vicinity of its periphery, a distance BFL between the image surface of the sixth lens element to an image plane, and a thickness T2 of said second lens element along said optical axis satisfy a relationship BFL/T2≤4.34.

8. The optical imaging lens set of claim 7, wherein the sum of all five air gaps Gaa between each lens element from said first lens element to said sixth lens element along the optical axis satisfies a relationship Gaa/G23≤2.55.

9. The optical imaging lens set of claim 1, wherein the second lens element has an object-side surface with a convex part in a vicinity of the optical axis, and the sixth lens element has an object-side surface with a concave part in a vicinity of its periphery, a distance BFL between the image surface of the sixth lens element to an image plane satisfy a relationship BFL/G23≤1.16.

10. The optical imaging lens set of claim 1, wherein the second lens element has an object-side surface with a convex part in a vicinity of the optical axis, and the sixth lens element has an object-side surface with a concave part in a vicinity of its periphery, a distance BFL between the image surface of the sixth lens element to an image plane, and a thickness T5 of said fifth lens element along said optical axis satisfy a relationship 1.33≤BFL/T5≤3.91.

11. The optical imaging lens set of claim 10, wherein a distance G34 between the third lens element and the fourth lens element along the optical axis, a distance G45 between the fourth lens element and the fifth lens element along the optical axis, and a distance G56 between the fifth lens element and the sixth lens element along the optical axis satisfy a relationship (G23+G34)/(G45+G56)≥9.0.

12. The optical imaging lens set of claim 1, wherein the second lens element has an object-side surface with a convex part in a vicinity of the optical axis, and the sixth lens element has an object-side surface with a concave part in a vicinity of its periphery, a total thickness ALT of said first lens element, said second lens element, said third lens element, said fourth lens element and, fifth lens element and said sixth lens element along said optical axis, and a thickness T5 of said fifth lens element along said optical axis satisfy a relationship 5.26≤ALT/T5≤10.38.

13. The optical imaging lens set of claim 12, wherein a distance BFL between the image surface of the sixth lens element to an image plane, and a distance G12 between the first lens element and the second lens element along the optical axis satisfy a relationship BFL/G12≥0.85.

14. The optical imaging lens set of claim 1, wherein the second lens element has an object-side surface with a convex part in a vicinity of the optical axis, and the sixth lens element has an object-side surface with a concave part in a vicinity of its periphery, the image-surface of the fifth lens element further comprises a convex part in the vicinity of the optical axis.

15. The optical imaging lens set of claim 1, further comprising an aperture stop disposed between the third lens element and the fourth lens element.

16. The optical imaging lens set of claim 1, further comprising an aperture stop disposed between the second lens element and the third lens element.

17. An electronic device, comprising:
    a case; and
    an image module disposed in said case and comprising:
        an optical imaging lens set of claim 1;
        a barrel for the installation of said optical imaging lens set;
        a module housing unit for the installation of said barrel;
        a substrate for the installation of said module housing unit; and
        an image sensor disposed on the substrate and disposed at an image side of said optical imaging lens set.

* * * * *